United States Patent
Okamoto et al.

(10) Patent No.: US 7,266,219 B2
(45) Date of Patent: Sep. 4, 2007

(54) MONITORING SYSTEM

(75) Inventors: Shusaku Okamoto, Osaka (JP); Masamichi Nakagawa, Osaka (JP); Kunio Nobori, Osaka (JP); Atsushi Morimura, Nara (JP); Nobuhiko Yasui, Osaka (JP); Akira Ishida, Osaka (JP); Atsushi Iisaka, Osaka (JP); Takashi Yoshida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 583 days.

(21) Appl. No.: 10/088,606

(22) PCT Filed: Jul. 19, 2001

(86) PCT No.: PCT/JP01/06313

§ 371 (c)(1),
(2), (4) Date: Jul. 17, 2002

(87) PCT Pub. No.: WO02/07443

PCT Pub. Date: Jan. 24, 2002

(65) Prior Publication Data

US 2003/0021490 A1    Jan. 30, 2003

(30) Foreign Application Priority Data

Jul. 19, 2000    (JP) ............... 2000-219513

(51) Int. Cl.
*G06K 9/36*    (2006.01)
*H04N 7/18*    (2006.01)
*H04N 9/47*    (2006.01)
*B60Q 1/48*    (2006.01)
*G08G 1/14*    (2006.01)

(52) U.S. Cl. ............... 382/104; 382/285; 348/148; 340/901; 340/932.2

(58) Field of Classification Search ............... 382/104, 382/285; 348/113, 115, 118, 148, 561; 340/426.22, 340/426.23, 426.33, 435–437, 901, 937, 340/932.2
See application file for complete search history.

(56) References Cited

U.S. PATENT DOCUMENTS 5,949,331 A * 9/1999 Schofield et al. ........... 340/461

(Continued)

FOREIGN PATENT DOCUMENTS

EP    1115250 A1 *    7/2001

(Continued)

OTHER PUBLICATIONS

International Search Report—PCT/JP01/06313, Japanese Patent Office, Oct. 12, 2001.

*Primary Examiner*—Andrew W. Johns
*Assistant Examiner*—Anthony Mackowey
(74) *Attorney, Agent, or Firm*—Harness, Dickey & Pierce, P.L.C.

(57) ABSTRACT

For supporting a complicated driving operation, a synthesized image is presented to the driver. The driver can view this image and thus drive with a sense of security. The synthesized image may include an image of at least one tire and may have an enlargement/reduction ratio that is relatively higher in a nearby area of the vehicle, including a grounding portion of at least one tire of the vehicle, as compared with a peripheral area of the vehicle.

6 Claims, 21 Drawing Sheets

U.S. PATENT DOCUMENTS

| | | | |
|---|---|---|---|
| 5,999,660 A * | 12/1999 | Zorin et al. | 382/276 |
| 6,259,359 B1 * | 7/2001 | Fujinami et al. | 340/435 |
| 6,580,373 B1 * | 6/2003 | Ohashi | 340/901 |
| 7,034,861 B2 * | 4/2006 | Okada et al. | 348/36 |
| 2004/0085447 A1 * | 5/2004 | Katta et al. | 348/143 |

FOREIGN PATENT DOCUMENTS

| | | |
|---|---|---|
| JP | 01-123587 | 5/1989 |
| JP | 01-168538 | 7/1989 |
| JP | 09-037235 | 2/1997 |
| JP | 11078692 | 3/1999 |
| JP | 2000-125156 | 4/2000 |
| JP | 2000-168475 | 6/2000 |
| WO | 00/07373 | 2/2000 |

* cited by examiner

⟨Projected on cylindrical model⟩

<Projected on bowl model>

Parked vehicle (same)

Virtual visual point image generated by using cameras on both side portions

Virtual visual point image generated by using cameras on front and rear portions

MONITORING SYSTEM

TECHNICAL FIELD

The present invention relates to an image processing technique to generate a synthesized image by using camera images captured by a plurality of cameras installed on a vehicle, and more particularly, it relates to a technique effective for a monitoring system used for, for example, supporting safety check in driving a vehicle.

BACKGROUND ART

As an apparatus for monitoring the state around a vehicle by using a camera, a system in which a camera is installed on a rear trunk room or the like of the vehicle so as to present images obtained by this camera to a driver is conventionally known. Thus, the driver can be informed of the state in the rear of the vehicle without viewing a mirror. Furthermore, a system in which not only camera images but also travel path of tires overlapping the camera images are presented (which system is herein designated as the "conventional system 1") has recently been known. Thus, the driver can not only grasp the state in the rear of the vehicle but also predict the state ahead of the vehicle.

In the conventional system 1, however, although the state in the rear of the vehicle can be grasped, the state in regions other than the rear should be unavoidably checked by visual observation and with the mirror. In contrast, an example of a system for informing a driver of the positional relationship between the vehicle and the surrounding state objectively and comprehensively is an apparatus disclosed in Literature 1, Japanese Laid-Open Patent Publication No. 11-78692. Literature 1 discloses a system (herein designated as the "conventional system 2") in which a plurality of (eight) cameras for providing images for a vehicle are installed on peripheral portions of the vehicle so that images obtained by transforming camera images captured by the respective cameras (hereinafter referred to as the "partial images") can be synthesized to obtain a new image of an extensive view around the vehicle. In particular, since continuity in boundaries between adjacent partial images is retained in transforming and arranging the camera images captured by the plural cameras, an image in which the rough positional relationship between the vehicle and a nearby object can be easily grasped can be presented to the driver.

PROBLEMS TO BE SOLVED BY THE INVENTION

In the case where an image synthesized by the aforementioned conventional system is presented to a driver in a variety of driving situations, the following problems occur:

1. Disadvantages of Conventional System 1 and Problem to be Solved:

In the conventional system 1, since a camera image includes a region within a limited angle behind the rear end of the vehicle, closeness in a region in front of the rear end of the vehicle, such as closeness between the right or left side body of the vehicle and a nearby object, can be checked merely by using a door mirror. Therefore, in order to grasp both the closeness in such a region and the state in the rear, the driver should pay attention to both a displayed image and the door mirror, which increases the burden of the driver.

Also, since the state in a limited visual field in the rear of the vehicle is displayed in the conventional system 1, this is not suitable for use in a driving scene where it is necessary to grasp the state in a wide range. For example, in the case where the vehicle is to be maneuvered to a road by reversing while largely wheeling the steering wheel as shown in FIG. 4, in order to check other vehicles approaching from the right and left hand sides of the road, it is necessary to present the driver with an image having a visual field of substantially 180 degrees in the rear. The visual field of an image presented in the conventional system 1 is, however, too small to employ in such use.

Accordingly, a first problem to be solved is presenting a driver with a synthesized image for allowing the driver to drive with a sense of security by merely viewing the image in the case as shown in FIG. 4.

2. Disadvantages of Conventional System 2 and Problems to be Solved:

First Problems: Display Range

In the conventional system 2, in order to comprehensively present the positional relationship in the near region around the vehicle, it discloses presentation of merely an image in which the surrounding state is shown as if it were looked down from above the vehicle. However, it does not disclose any method for presenting an image in which both the state near the vehicle and the state in other regions can be simultaneously grasped. Accordingly, in the following driving situations (a) and (b), the driving cannot be sufficiently supported merely by presenting a synthesized image of the conventional system 2:

(a) In driving close to road edge or the like:

In driving close to a road edge or the like, the following two points are required of an image to be presented to the driver: One point is how close the vehicle is to the road edge; and another point is whether or not there is any obstacle such as a light pole or a parking ticket dispenser in a moving direction if the vehicle moves directly forward or backward, whether or not any vehicle is approaching from the opposite direction, and if there is such an obstacle or approaching vehicle, whether or not it can be dodged without scraping.

However, the visual range is limited in an overlook image. Therefore, when the closeness to the road edge is desired to fully check, an image of the near region alone is necessary. On the other hand, when the state ahead in the moving direction is desired to check, an image with a range of several meters or over ten meters ahead is necessary. These necessities cannot be satisfied by using one image.

Accordingly, a second problem to be solved is, in such a case of driving close to the road edge or the like, presenting a driver with a synthesized image in which both the closeness of the vehicle to the road edge and the state ahead in the forward or backward moving direction can be simultaneously grasped.

(b) In parking accompanied with back-and-forth movement:

In the case where the vehicle is to be parked with the overlook image presented, it is necessary to check the state in the rear while slowly reversing at the initial stage of the parking operation. However, since the visual range is limited in the overlook image, the driver unavoidably uses a mirror for checking the state in the rear during this reversing, which increases the burden of the driver. Also, in the case where a maneuvering operation accompanied with back-and-forth movement (an operation for maneuvering the vehicle to a desired place by slightly driving the vehicle forward or backward) is frequently repeated in the parking operation, the state in not only the rear but also the front should be checked.

Accordingly, a third problem to be solved is, in maneuvering accompanied with back-and-forth movement for parking, presenting a driver with a synthesized image in which not only the surrounding state but also the state ahead in the forward or backward moving direction can be simultaneously grasped.

Second Problem: Vanishment of Object

Vanishment of an object is a problem as follows: Since images are transformed so as to be continuous on boundaries in at least road surface areas, a three-dimensional object that should be transformed in accordance with the transformation of the images is erased due to the layout of the partial images.

FIG. 17A shows a pole P1 standing in the right rear corner of a vehicle. When this pole P1 is captured by both cameras 2 and 3 of FIG. 2, a pole P1A included in a camera image of the camera 2 is distorted to extend downward below the standing position of the pole P1 due to the image transformation. On the other hand, a pole P1B included in a camera image of the camera 3 is distorted to extend rightward from the standing position of the pole P1 due to the image transformation. Since the poles P1A and P1B both extend over areas not used as the partial images, the extending portions are erased, and as a result, a portion of the pole P1 in contact with the ground alone remains in a synthesized image (as shown in FIG. 17B). Accordingly, the actually existing pole is difficult to recognize in the synthesized image. This is the cause of the problem of the vanishment of an object.

Accordingly, a fourth problem to be solved is avoiding this vanishment problem by presenting a driver with a synthesized image in which both the rough positional relationship between the vehicle and a nearby object and the distance to the object can be simultaneously grasped.

Third Problem: Discontinuity on Boundary

In the conventional system 2, the respective camera images are transformed so as to retain the continuity on the boundary between the adjacent partial images, but it is theoretically difficult to retain the continuity over the entire boundary. Accordingly, in the present system, images are transformed with retaining continuity on the road surface so that at least objects present on the road surface can be smoothly recognized. However, an object other than those present on the road surface is largely distorted to elongate due to this transformation, which leads to a problem that an object imaged on a boundary other than those present on the road surface is discontinued on the boundary. For example, as shown in FIG. 18, a parked vehicle imaged on the boundary between partial images respectively obtained by transforming camera images of the cameras 2 and 3 is discontinued on the boundary, resulting in an unclear image. Since the distance to the nearby object cannot be grasped based on such an unclear image, the driver is unavoidably forced to check the object with a mirror or the like, which increases the burden.

Accordingly, a fifth problem to be solved is avoiding this problem by presenting a driver with a synthesized image always including information necessary for safety driving at least in camera images.

Furthermore, in consideration of the problem of discontinuity on a boundary between partial images, the usefulness of a synthesized image in various driving scenes largely depends upon the position of a boundary in the synthesized image. It has been found through an experiment performed on approximately ten subjects by the present inventors that, in most of the complicated driving operations such as parking (in parallel to the road edge or to an adjacent vehicle) and driving close to a road edge, drivers desire to know detailed state not in the front and the rear of the vehicle but in the right and left regions with a range of 180 degrees.

Accordingly, a sixth problem is presenting a synthesized image more continuous in the right and left hand side regions of the vehicle, but the conventional system 2 does not disclose any means for solving this problem.

DISCLOSURE OF THE INVENTION

Means of this invention for overcoming the first problem is a monitoring system comprising at least one camera installed on a vehicle and having a lateral visual field of substantially 180 degrees as a camera range in the rear of the vehicle; and an image processing unit for receiving, as an input, a camera image of the camera and generating, from the camera image, an image viewed from a virtual viewpoint to be displayed on a display device, wherein the image processing unit has a mode for displaying a mirror image of an image having a lateral visual field of substantially 180 degrees in the rear of the vehicle.

According to the invention, an image of an extensive view with a lateral visual field of 180 degrees in the rear of the vehicle is displayed in the form of a mirror image. Therefore, a user can definitely grasp an object present in this visual range by using the displayed image.

Alternatively, means of this invention for overcoming the second problem is a monitoring system comprising one or more cameras for capturing surrounding state of a vehicle; and an image processing unit for receiving, as an input, a camera image of the one or more cameras and generating, from the camera image, a synthesized image to be displayed on a display device, wherein the image processing unit has a mode for displaying a synthesized image in which an enlargement/reduction ratio is relatively higher in a nearby area of the vehicle including a grounding portion of at least one tire of the vehicle than in a peripheral area of the vehicle.

According to the invention, the synthesized image in which the enlargement/reduction ratio is relatively higher in the nearby area including the grounding portion of at least one tire of the vehicle than in the peripheral area is displayed. Therefore, a user can simultaneously check, on the same image, the detailed state close to and below the vehicle and the state ahead in the moving direction.

The enlargement/reduction ratio preferably becomes lower in a direction from the nearby area of the vehicle to the peripheral area of the vehicle in the synthesized image.

The image processing unit preferably generates the synthesized image in such a manner that an area along a side surface of the vehicle has linearity.

Furthermore, it is preferred that at least one camera out of the one or more cameras is installed to have a camera range at least including part of a body side surface and part of a front tire, and that the image processing unit generates, from a camera image of the at least one camera, the synthesized image in such a manner that the body side surface and the front tire are imaged therein.

Alternatively, the monitoring system of this invention comprises one or more cameras for capturing surrounding state of a vehicle; and an image processing unit for receiving, as an input, a camera image of the one or more cameras and generating a synthesized image from the camera image to be displayed on a display device, and at least one camera out of the one or more cameras is installed to have a camera range at least including part of a tire of the vehicle, and the image processing unit generates, from a camera image of the at least one camera, the synthesized image in such a manner that the tire is imaged therein.

Alternatively, means of this invention for overcoming the third problem is a monitoring system comprising one or more cameras for capturing surrounding state of a vehicle; and an image processing unit for receiving, as an input, a camera image of the one or more cameras and generating a virtual viewpoint image viewed from a virtual viewpoint to be displayed on a display device, wherein the image processing unit has a mode for displaying, in parallel to the virtual viewpoint image, an image of a region ahead in a moving direction of the vehicle or in a direction to which the vehicle is able to move with a positional relationship with the virtual viewpoint image kept.

According to the invention, the image of the region in the moving direction or in the direction to which the vehicle can move is displayed together with the virtual viewpoint image with the positional relationship therebetween kept. Therefore, a user can simultaneously check, on the same image, not only the state around the vehicle but also the state ahead in the forward or backward moving direction.

Means of the invention for overcoming the fourth problem is a monitoring system comprising a plurality of cameras for capturing surrounding state of a vehicle; and an image processing unit for receiving, as an input, camera images of the plurality of cameras and generating, from the camera images, a virtual viewpoint image viewed from a virtual viewpoint to be displayed on a display device, wherein the plurality of cameras include a first camera and a second camera having overlapping camera ranges, and the image processing unit is able to generate a first virtual viewpoint image that is generated by using the first camera without using the second camera and includes a portion overlapping in the camera range of the first camera with the second camera and a portion not overlapping, and a second virtual viewpoint image that is generated by using the second camera without using the first camera and includes a portion overlapping in the camera range of the second camera with the first camera and a portion not overlapping.

According to the invention, a plurality of virtual viewpoint images can be generated by using one camera without using the other camera out of the first and second cameras having the overlapping camera ranges. In other words, each virtual viewpoint image includes a portion overlapping in the camera range of one camera used for the generation with the other camera and a portion not overlapping. Therefore, an object present in the overlapping portion never vanishes in the virtual viewpoint image. Accordingly, a problem of vanishment of an object, which is derived from processing of camera images performed for keeping linearity in the virtual viewpoint image, can be avoided. As a result, an image always including information necessary for safety driving can be presented to a driver.

The image processing unit preferably has a mode for displaying the first and second virtual viewpoint images in parallel on one screen.

Also, it is preferred that the first virtual viewpoint image is generated by using merely camera images of cameras installed on side portions of the vehicle, and that the second virtual viewpoint image is generated by using merely camera images of cameras installed on front and rear portions of the vehicle.

Means of this invention for overcoming the fifth problems is a monitoring system comprising a plurality of cameras for capturing surrounding state of a vehicle; and an image processing unit for receiving, as an input, camera images of the plurality of cameras and generating, from the camera images, a virtual viewpoint image viewed from a virtual viewpoint to be displayed on a display device, wherein the plurality of cameras include at least a first camera for capturing a left rear region of the vehicle and a second camera for capturing a right rear region of the vehicle, and the image processing unit has a mode for displaying, together with the virtual viewpoint image, at least part of a mirror image of the camera image of the first camera or the second camera.

According to the invention, a camera image as if it were viewed on a left or right door mirror can be displayed together with the virtual viewpoint image. Therefore, a user can check, in one screen without moving the line of sight, the rough positional relationship between the vehicle and a nearby object by using the virtual viewpoint image and a distance between the vehicle and an object present in a side region behind the driver's seat by using the door mirror image.

Means of this invention for overcoming the sixth problem is a monitoring system comprising a plurality of cameras for capturing surrounding state of a vehicle; and an image processing unit for receiving, as an input, camera images of the plurality of cameras and generating, from the camera images, a virtual viewpoint image viewed from a virtual viewpoint to be displayed on a display device, wherein the image processing unit has a mode for preferentially using a camera image of a camera installed on a side portion of the vehicle in generating the virtual viewpoint image.

According to the invention, the camera image of the camera installed on the side portion of the vehicle is preferentially used in generating a virtual viewpoint image in a given mode. Therefore, with respect to a side region whose detailed state a driver desires to grasp in most of complicated driving operations, a comprehensive image free from a discontinued area can be presented to the driver.

BEST MODE FOR CARRYING OUT THE INVENTION

Preferred embodiments of the present invention will now be described with reference to the drawings. The entire structure of a monitoring system of this invention necessary for practicing the respective embodiments will be described first, and then, examples of various display modes according to the invention will be described in detail.

Figure 1:
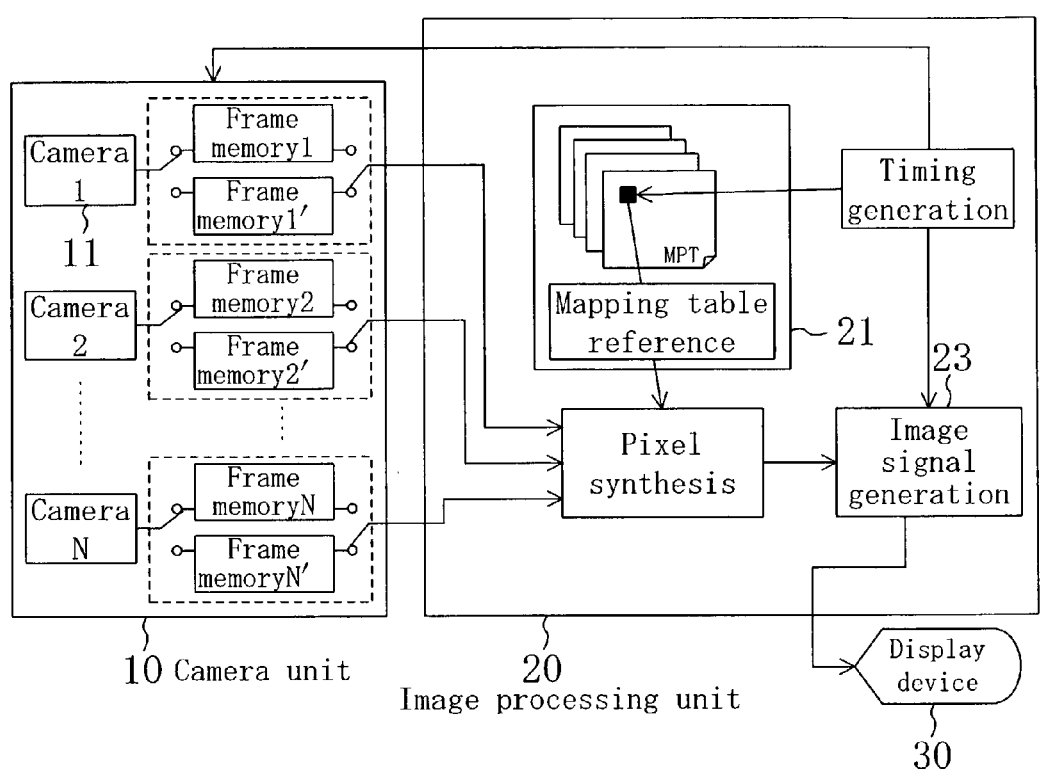
FIG. 1 is a block diagram for showing the structure of a monitoring system according to each embodiment of the invention.

FIG. 1 is a block diagram for showing the structure of the monitoring system of this invention. In the monitoring system of FIG. 1, an image processing unit 20 receives, as an input, a plurality of camera images output from cameras 11 and generates a new image by transforming and synthesizing the camera images. The resultant synthesized image is displayed by a display device 30. The image processing unit 20 constitutes an image processor according to this invention.

Herein, a "synthesized image" means not only an image generated from a plurality of camera images but also an image generated by transforming and synthesizing one camera image.

The display device 30 of this invention is typically a liquid crystal display and may be another display device such as a plasma display. Also, the display device of this invention may be used also as a vehicle-install type GPS terminal display (namely, a display of what is called a car navigation system) or may be separately prepared.

A camera unit 10 is a color or monochrome digital camera typically including a solid state image sensor such a CCD or a CMOS device. Alternatively, camera means may include a combination of a lens and a prism or a mirror so as to transfer incident light to the lens and the prism or the mirror through a predetermined optical path to a camera device disposed away from the camera means.

Figure 2:
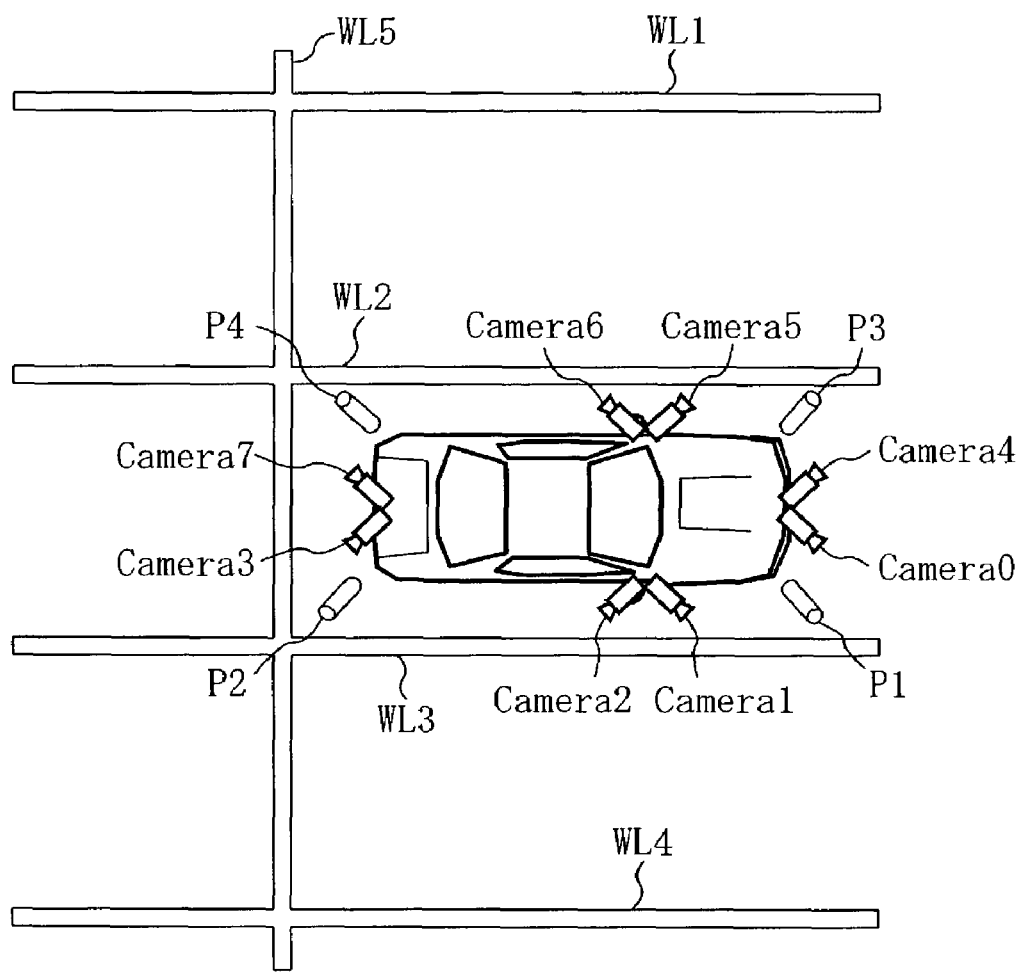
FIG. 2 is a diagram for showing an example of camera arrangement.
Figure 3:
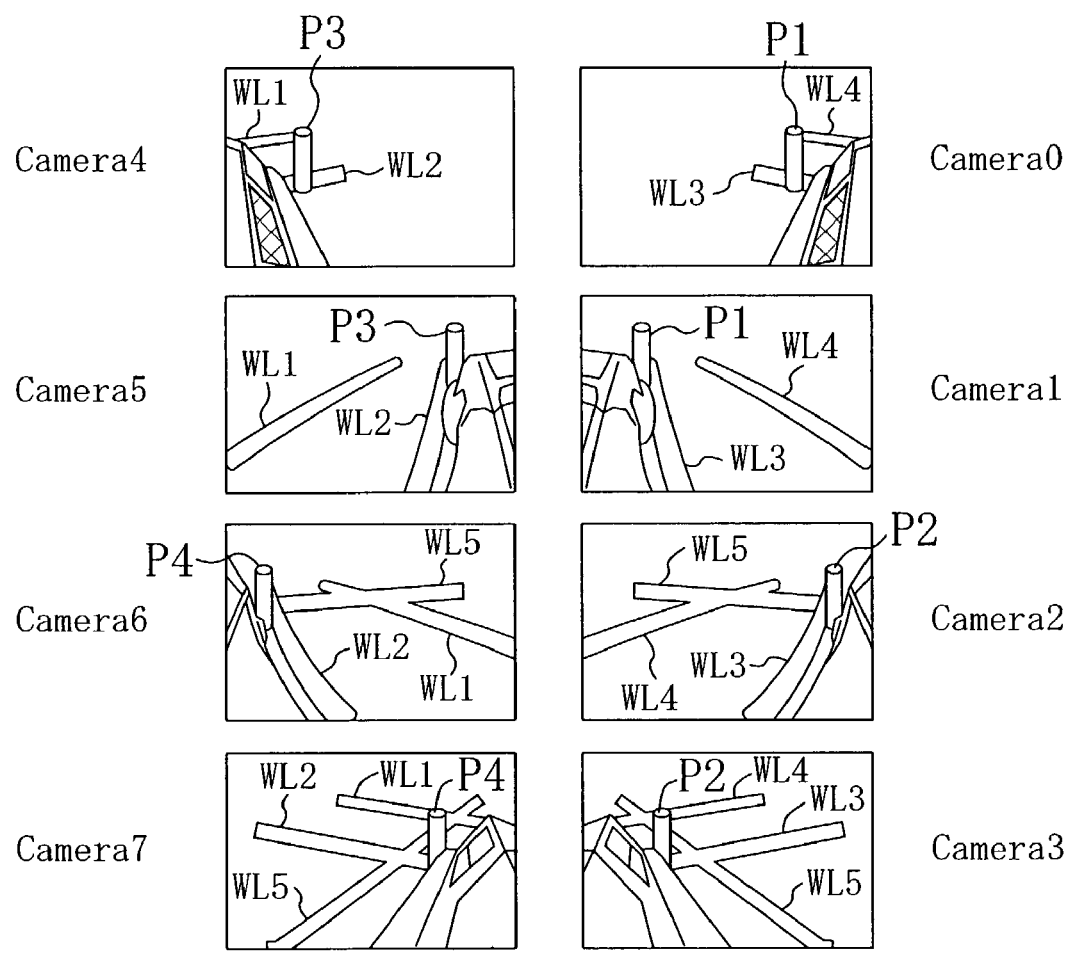
FIG. 3 is a diagram for showing examples of camera images captured by cameras of FIG. 2.

FIG. 2 shows an example of the arrangement of the cameras and FIG. 3 shows examples of camera images captured by the cameras of FIG. 2. In FIG. 2, WL1 through WL5 denote white lines and P1 through P4 denote poles. In the example shown in FIG. 2, two pair cameras are respectively installed in four places, specifically, on the grille, on the right and left door mirrors and on the rear trunk room, namely, eight cameras in total are used. The cameras are arranged as shown in FIG. 2 for the purpose of obtaining images of the four regions of the vehicle, that is, the front, the rear, the right and the left regions, each with a visual field of 180 degrees. Since a currently used camera cannot secure a visual field of 180 degrees by itself, two cameras are paired for convenience to attain a visual field of substantially 180 degrees.

The image processing unit 20 transforms/synthesizes eight camera images as shown in FIG. 3 (four camera images if the pair cameras are replaced with one camera), so as to generate, for example, a synthesized image as if it were vertically looked down from above the vehicle. In order to generate the synthesized image, it is necessary to perform image transforming processing and synthesizing processing of partial images obtained by cutting necessary areas out of the transformed images (including processing such as smoothing of boundaries (hereinafter referred to as the boundary processing)). For this purpose, the structure of FIG. 1 includes a mapping table referring unit 21 and a mapping table MPT is used for processing the camera images in one step.

The image processing unit 20 receives the camera images from the cameras 1 through N and processes these camera images. The processing performed at this point are ① processing for transforming and cutting the images and ② processing for synthesizing cut partial images (including the boundary processing). The processing ① and ② may be separately performed, or all or part of these processing may be performed in one step. In the structure of FIG. 1, the mapping table is included for performing the processing of the camera images in one step.

A "mapping table" means a table in which the corresponding relationships between pixels of a synthesized image and pixel data of the respective camera images are described, and is used for rapidly generating a synthesized image. When such a mapping table is previously built through calculation using geometric conversion or manual operations, a desired synthesized image can be rapidly generated. A display mode can be switched by exchanging the mapping table.

The mapping table is specifically stored in, for example, a ROM (including a writable erasable ROM such as an EEPROM) or a RAM. For storing the mapping table, mapping data obtained through calculation by a processor included in the image processing unit may be written in a ROM or a RAM, or mapping table data provided as firmware may be written in a RAM or a ROM by using data transfer means such as a communication line and a disk drive.

Now, examples of various display modes according to this invention will be described in detail.

EMBODIMENT 1

Figure 4:
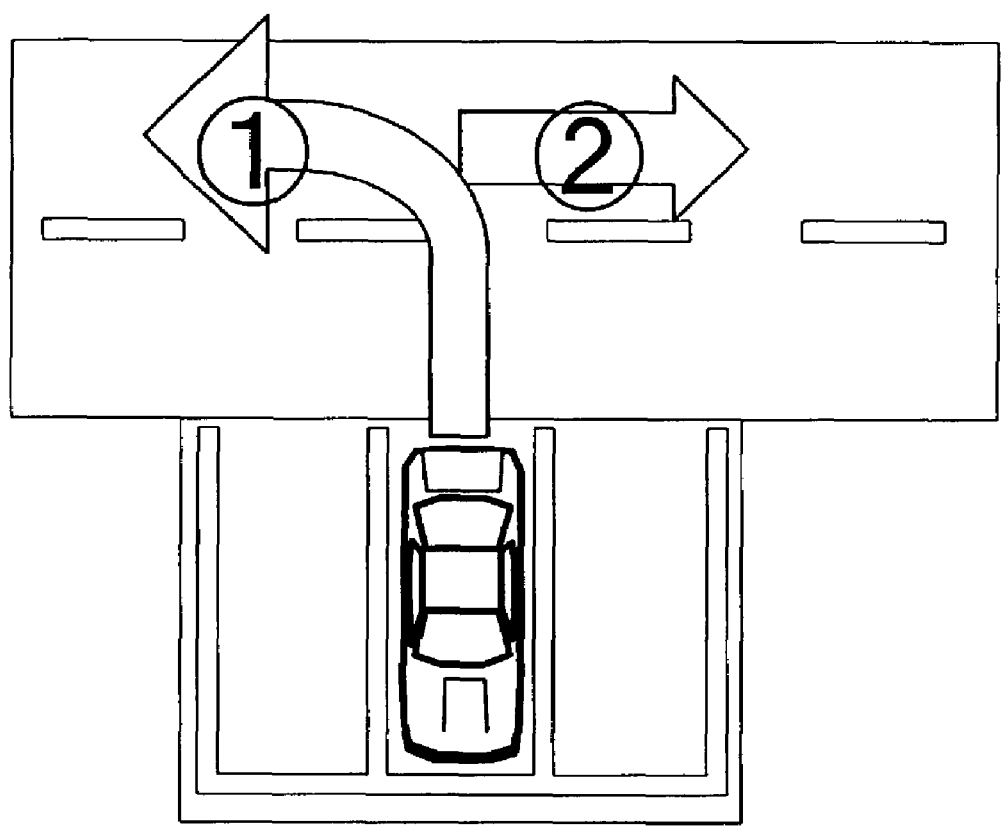
FIG. 4 is a diagram of an exemplified situation suitable to Embodiment 1 of the invention in which a vehicle is maneuvered to a road by reversing while largely wheeling the steering wheel.

Embodiment 1 corresponds to one aspect of the invention for overcoming the first problem, and is used, for example, in the case where a vehicle is to be maneuvered to a road by reversing while largely wheeling the steering wheel as shown in FIG. 4, for checking any vehicle approaching from the right or left hand side of the road.

Examples of the display mode will now be described.

Figure 5A:
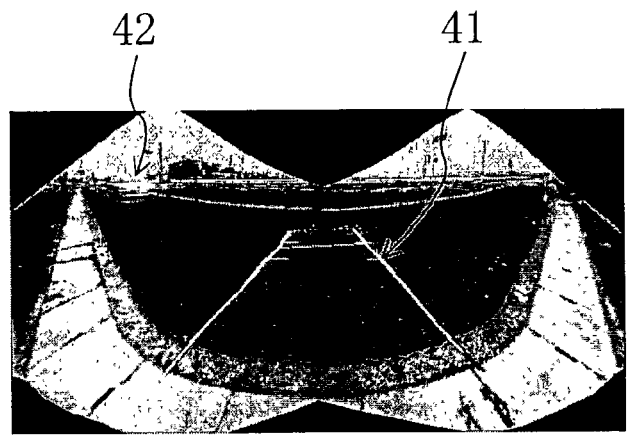
FIG. 5 is a diagram for showing examples of a display mode according to Embodiment 1 of the invention.

FIG. 5A shows an example of the display mode of this embodiment used for the check. Specifically, images captured by the cameras 3 and 7 of FIG. 2 are used so as to display a mirror image of an image with a lateral visual field of 180 degrees in the rear of the vehicle with overlapped tire loci 41 of the vehicle by assuming the reverse movement (although camera images used for the synthesis are not shown). As is understood from FIG. 5A, when the rear end of the vehicle is positioned at the very edge of the road running perpendicularly to the vehicle, view from one end to the other end of the road, namely, with a lateral visual field of 180 degrees, can be obtained. Accordingly, a driver can grasp, for example, another vehicle 42 actually approaching from the left hand side from his/her seat by merely viewing this image.

Figure 5B:
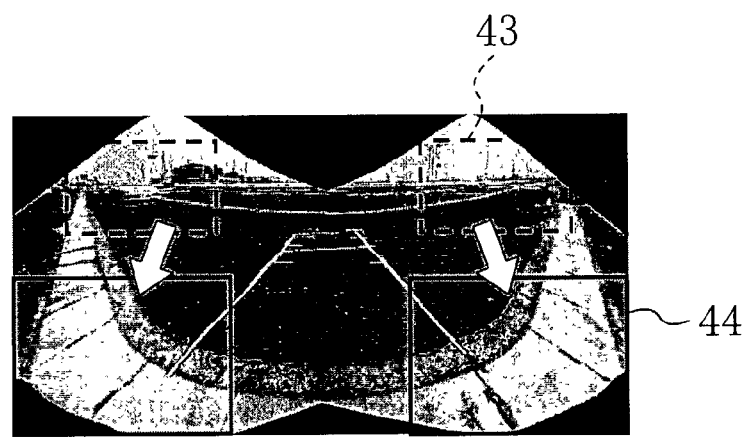

FIG. 5B shows another example of the display mode of this embodiment. This mode is usefully employed when the distance to a vehicle approaching from far is difficult to grasp because of, for example, low resolution of the cameras and the screen. Specifically, far regions (that is, rectangular areas 43 surrounded with broken lines) are enlarged to be displayed in sub-windows (rectangular areas 44 surrounded with solid lines) in other areas on the screen. Thus, the far regions and near regions can be simultaneously grasped in the whole image and the state in the far regions can be checked by using the sub-windows. Since the sub-windows are pasted on the whole image, the paste positions may be previously determined so as to prevent significant information for the driving from being covered.

Figure 5C:
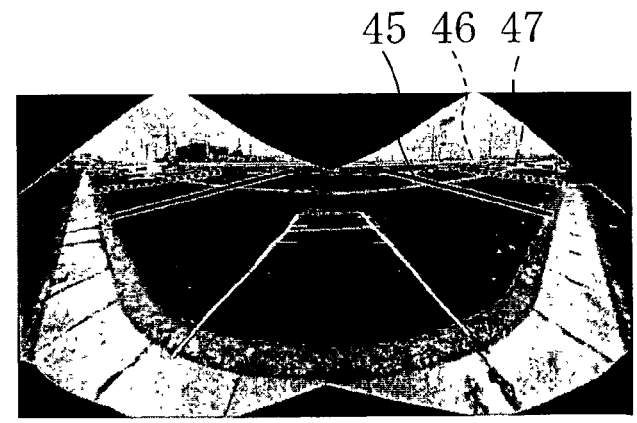

FIG. 5C also shows another example of the display mode of this embodiment. In this mode, when a distance to a vehicle approaching from far is difficult to grasp, auxiliary lines for indicating the distances are overlapped on the displayed image. Thus, the rough distance to the approaching vehicle can be grasped. In FIG. 5C, solid lines 45, fine broken lines 46 and rough broken lines 47 respectively indicate distances on the right and left hand sides of approximately 2 m, approximately 5 m and approximately 10 m away from the vehicle.

Next, a method for generating such an image with a visual field of 180 degrees will be simply described.

Figure 6:
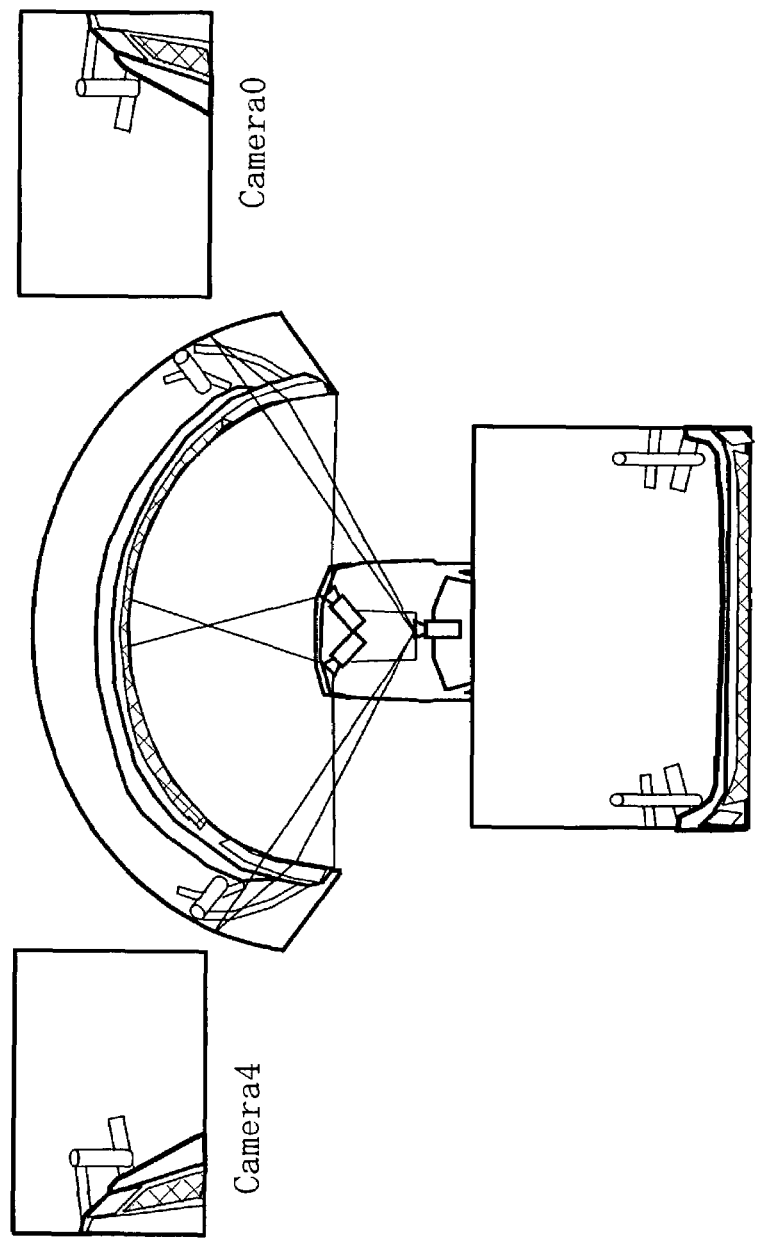
FIG. 6 is a diagram of image generation using a cylindrical model.

FIG. 6 shows a method for obtaining a panorama image with a visual field of 180 degrees by projecting the camera images of the pair cameras on a cylindrical model and directly arranging the projected images from one end of a rectangular screen. In this method, since the length of the image corresponds to an angle of the visual range of the cameras, the scale factor is the same in all the directions of the cameras in the resultant image.

Figure 7:
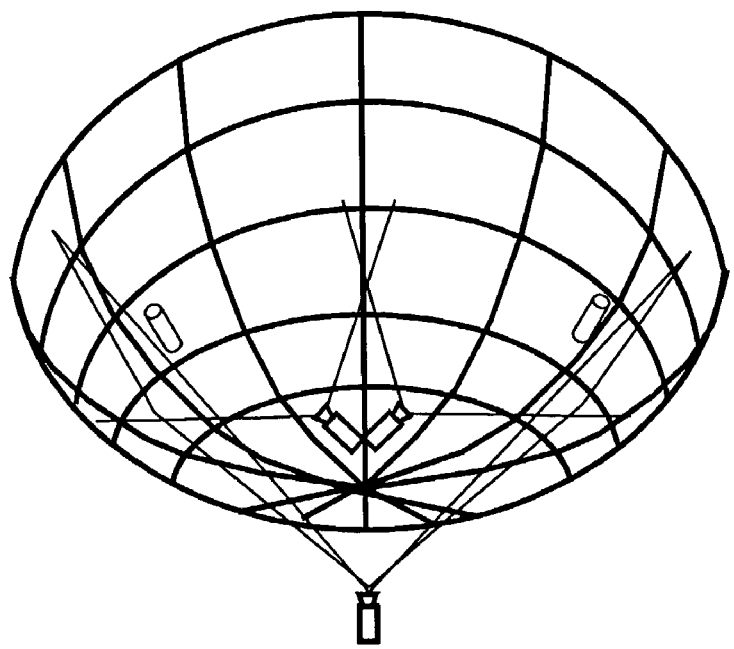
FIG. 7 is a diagram of image generation using a bowl model.

Alternatively, FIG. 7 shows a method for obtaining an image with a visual field of 180 degrees by using a bowl model other than the cylindrical model. This method is the same as that shown in FIG. 6 in projecting the camera images onto the model, but is different in providing a virtual viewpoint for viewing the projected image so as to generate an image by perspective projection conversion. In using this model, the shape of the bowl can be deformed or the position of the virtual viewpoint can be changed, so as to generate an image in which a region right behind the vehicle is enlarged with the side regions reduced or alternatively, an image in which the region right behind the vehicle is reduced with the side regions enlarged.

Although the visual field of 180 degrees in the rear is displayed in the examples of this embodiment, if there arises no practical problem by attaining a visual field of approximately 180 degrees, there is no need to install the cameras so as to attain the visual field of 180 degrees but the visual angle may be slightly smaller. Also, it goes without saying that a region unnecessary for the safety check in the rear, such as a region corresponding to the sky, may be cut off for display.

EMBODIMENT 2

Embodiment 2 corresponds to one aspect of the invention for overcoming the second problem, and for example, in the case of driving close to a road edge, a synthesized image in which not only the closeness of the vehicle to the road edge but also the state ahead in the forward or backward moving direction can be simultaneously grasped is presented to a driver.

Now, examples of the display mode will be described.

Figure 8A:
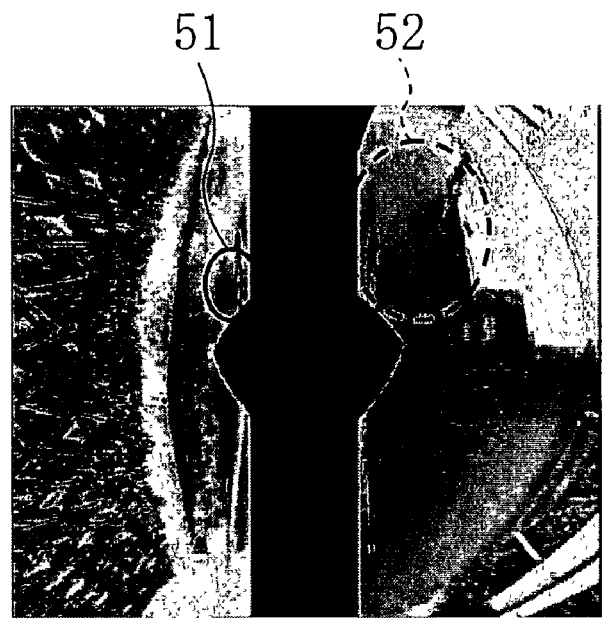
FIG. 8 is a diagram for showing examples of a display mode according to Embodiment 2 of the invention.
Figure 8B:
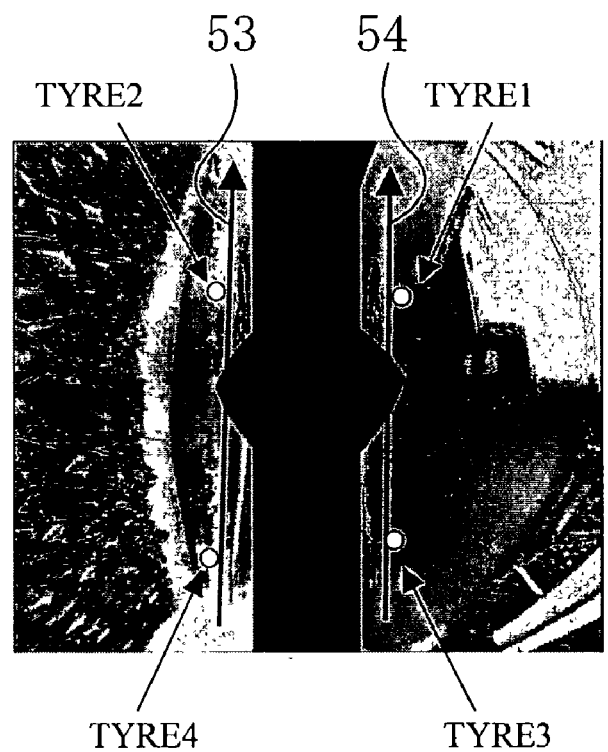

FIGS. 8A and 8B show the display mode of this embodiment generated by using the four cameras 1, 2, 5 and 6 of FIG. 2 (although camera images used for the synthesis are not shown). The image on the right hand side of the vehicle is generated by using the camera images of the cameras 1 and 2, and the image on the left hand side is generated by using the camera images of the cameras 5 and 6. Each of the synthesized images is generated in such a manner that the enlargement/reduction ratio of a nearby area of the vehicle including a grounding portion of the tire is relatively higher than the enlargement/reduction ratio of a peripheral area around the vehicle. Furthermore, the enlargement/reduction ratio is lower in a direction from the nearby area to the peripheral area.

An example of the method for synthesizing such an image will be simply described. In one effective method for simply generating such a synthesized image, a model is used for the synthesis as in the image synthesis of Embodiment 1. For example, when the bowl model of FIG. 7 is used, the image on the left hand side in FIG. 8A is synthesized as follows:

1. A bowl model is generated so that the bottom of the bowl model can be in contact with the road surface in a position between the cameras 5 and 6. At this point, the bowl model is set to have such a size that the vehicle is completely covered within the bowl.

2. Camera images captured by the cameras 5 and 6 are respectively projected onto the inside face of the bowl.

3. A virtual viewpoint is set above (for example, at a height of 4 m) the position between the cameras 5 and 6 to be downward, and the camera images of the cameras 5 and 6 projected on the bowl in the step 2 are viewed from the virtual viewpoint.

The processing including these three steps results in the synthesized image as shown on the left hand side of FIG. 8A in which the enlargement/reduction ratio of the nearby area of the vehicle including the grounding portion of the tire is relatively higher than the enlargement/reduction ratio of the peripheral area around the vehicle.

The reason why the peripheral area is more reduced when the bowl model is used is based on the following geometric characteristic: As the face of a model where a camera image is projected (corresponding to the inside face of the bowl in this example) approximates to parallel to the direction of a virtual viewpoint (the vertically downward direction in this example), the image projected on the face of the model is more reduced.

A strong merit of the aforementioned method is that the enlargement/reduction ratio of the peripheral area can be freely determined with respect to the enlargement/reduction ratio of the nearby area by deforming the bowl model or the like. For example, in the case where the bowl model is circular, areas farther from a center corresponding to the bottom of the bowl in the resultant images are more reduced regardless of the direction. Alternatively, the bowl may have an elliptical shape with the position of the bottom of the bowl model unchanged. When the major axis of the elliptical shape accords with the side surface of the vehicle, the rate of reduction in an area ahead in the moving direction of the vehicle can be smaller than the rate of reduction in an area on the side of the vehicle, centering around the area corresponding to the bottom of the bowl. Needless to say, the reverse is also possible.

In this embodiment, the method for synthesizing an image in which the enlargement/reduction ratio of the nearby area of the vehicle including the grounding portion of the tire is relatively higher than the enlargement/reduction ratio of the peripheral area around the vehicle by using the bowl model is described. Needless to say, such an image can be synthesized by another method not using the bowl model.

Also, the cameras are installed on the body of the vehicle, the virtual viewpoint is set substantially above the cameras to be downward and the bowl model is used for synthesizing the image. In other words, even when the aforementioned reduction transformation is performed by centering around the installation position of the camera, the linearity of the side surface of the body and the linearity ahead in the moving direction can be retained. The image of FIG. 8B is generated by using an image that is synthesized by using the bowl model with the virtual viewpoint set substantially above the cameras 1 and 2 to be downward and an image that is synthesized by using the bowl model with the virtual viewpoint set substantially above the cameras 5 and 6 to be downward.

Next, driving close to a gutter provided at the road edge by using the image of FIG. 8A will be specifically described. In FIG. 8A, the area close to the vehicle is enlarged so as to grasp how much room remains from the passenger's seat side to the gutter at the road edge, and resolution for realizing recognition of at least approximately 5 cm is kept in this nearby area. In addition, the tires of the vehicle are also imaged (shown as an area 51 surrounded with a solid line) so that it can be determined how close the vehicle is to the road edge by merely viewing the image. It has been found through an experiment that a driver who used to have a difficulty in driving close to the road edge by 10 cm or less can easily drive closer by 5 cm or less when this image is presented. Thus, it has been confirmed that this display mode can exhibit a remarkable effect in driving close to a road edge.

On the other hand, this display mode can be used for checking room (shown as a circular area 52 surrounded with a broken line) between the vehicle and a vehicle running in the opposite direction on the right hand side of the vehicle. FIG. 8B shows the display mode the same as that of FIG. 8A as an example of the situation requiring such check. Since the image in the front area is reduced with the linearity kept in this display mode, lines drawn to be in contact with the front and rear tires (specifically, a line 53 passing through the tires TYRE1 and TYRE3 and a line 54 passing through the tires TYRE2 and TYRE4) correspond to movement lines of the vehicle. Therefore, in the case where another vehicle is approaching from the front on the right, it can be easily judged whether or not the vehicle would scrape the vehicle running in the opposite direction by checking whether the vehicle running in the opposite direction is on the right hand side of the right movement line or over the movement line. Needless to say, since the image is more reduced in a further forward area, even when the vehicle running in the opposite direction is approaching from far, the judgment can be made beforehand on the screen, and hence, the driver can drive the vehicle calmly. The example of FIG. 8B shows that the vehicle running in the opposite direction, which is obviously on the right hand side of the right movement line, safely passes by on the right hand side of the vehicle without scraping. It is confirmed through an experiment that the driving operation is eased if the state in a front area ahead by at least approximately 5 m can be seen.

However, in the case where the vehicle actually passes by a vehicle running in the opposite direction, this may be insufficient. Specifically, in the case where there is any object protruding beyond the body like a door mirror, not only the check of the screen but also direct visual check by the driver is necessary.

Although all the four tires are imaged in FIG. 8, some of the tires, for example, the front tires alone may be imaged on the synthesized image.

Although the display mode of Embodiment 2 has been described by showing the use of the four cameras as an example, the invention is not limited to this but can be practiced by using merely one camera. For example, even in the case where merely one camera facing forward can be installed on the side portion on the passenger's seat side due to restriction in cost or the like, an image effectively used for driving close to a road edge can be presented to a user by the invention.

Figure 19A:
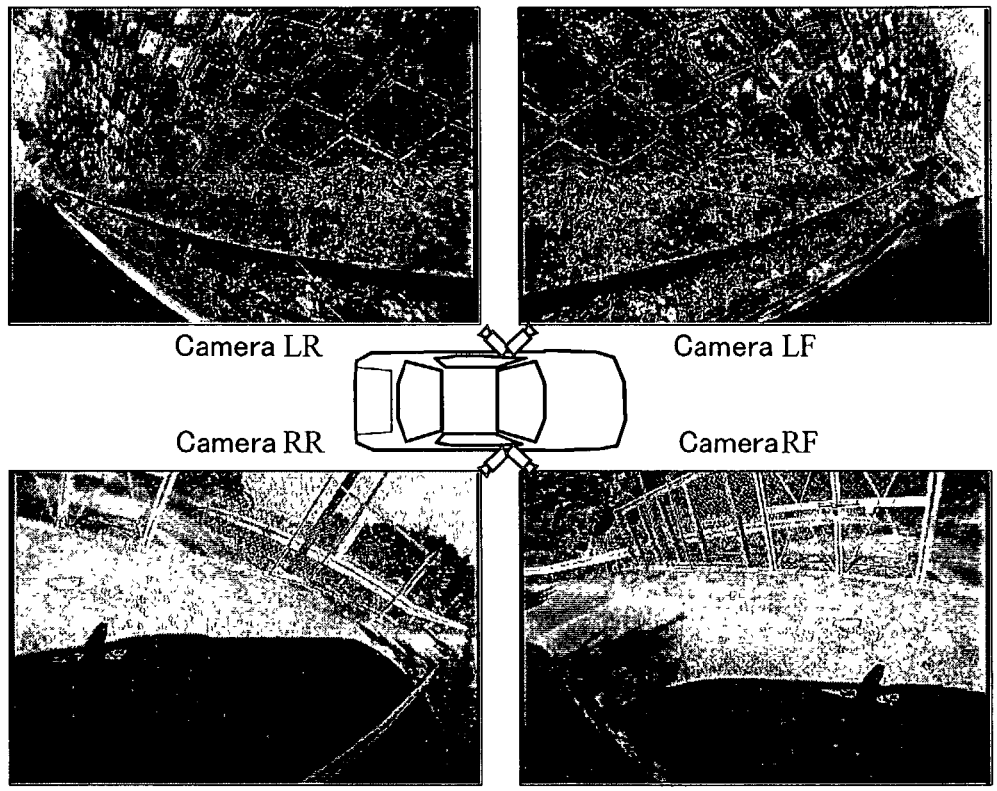
FIG. 19 is a diagram of other examples of the display mode according to Embodiment 2 of the invention.
Figure 19B:
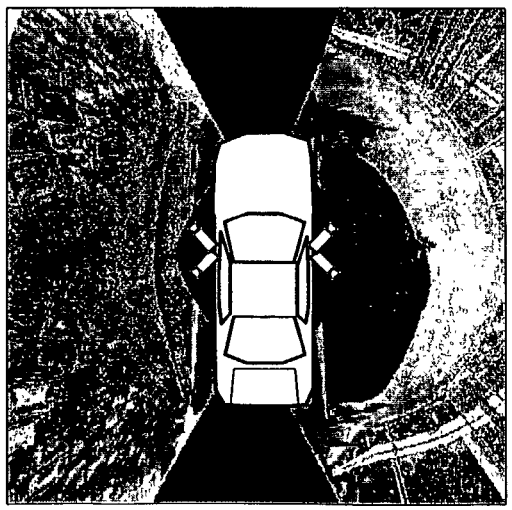
Figure 19C:
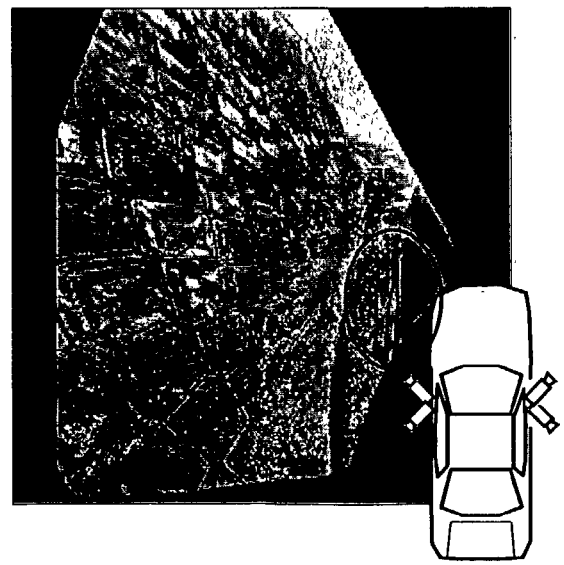

FIG. 19 is a diagram for showing a display mode of this embodiment using one camera alone in comparison with the case where a plurality of cameras are used. FIG. 19A shows an example of camera images of four cameras RF, RR, LF and LR installed on the right and left portions of the vehicle, and FIG. 19B shows a synthesized image generated from the four camera images of FIG. 19A in the same manner as in FIG. 8. In contrast, FIG. 19C is an image synthesized from the camera image of the camera LF alone of FIG. 19A. Illustrations of the vehicle shown in FIGS. 19B and 19C are pasted for showing the rough position of the vehicle in the synthesized images, and hence do not necessarily accord with the vehicle imaged in the synthesized image.

In the example of FIG. 19C, since merely one camera is used for the image synthesis, the visual field range of the image is restricted as compared with that in the example of FIG. 19B. However, since the area close to the vehicle is enlarged with the resolution for realizing recognition of at least approximately 5 cm kept, it can be understood how much room remains from the passenger's seat side of the vehicle to the gutter at the road edge. In addition, the tire of the vehicle is also imaged (shown with a circular area surrounded with a solid line) so that it can be easily recognized how close the vehicle is to the road edge merely by viewing the image.

Accordingly, if the image of FIG. 19C is displayed, even in the case where the vehicle passes by a vehicle running in the opposite direction in a driving situation where the road is narrow and has a gutter at the road edge on the passenger's seat side, the driver can drive forward and close to the road edge while checking whether or not the tires would fall into the gutter. Needless to say, a distance to the vehicle running in the opposite direction should be checked by the driver him/herself, but the burden of the driver in driving close to the road edge can be largely reduced.

Moreover, when a fisheye lens is used, merely one camera can attain a sufficiently large visual field range. For example, the invention may be practiced by using a camera image of a camera equipped with a fisheye lens of a visual angle of approximately 180 degrees installed on the side portion on the passenger's seat side of the vehicle. Thus, an image with a wide range on the side opposite to the driver's seat can be displayed, so that the driver can driver more safely.

EMBODIMENT 3

Embodiment 3 corresponds to one aspect of the invention for overcoming the third problem, and in, for example, maneuvering for parking accompanied with back-and-forth movement, a synthesized image in which not only the surrounding state but also the state ahead in the forward or backward moving direction can be simultaneously grasped is presented to a driver.

Now, examples of the display mode respectively employed in three situations, that is, in stopping a vehicle, in driving forward and in driving backward, will be specifically described with reference to FIGS. 9 and 10 (although camera images used for the synthesis are not shown).

Figure 9A:
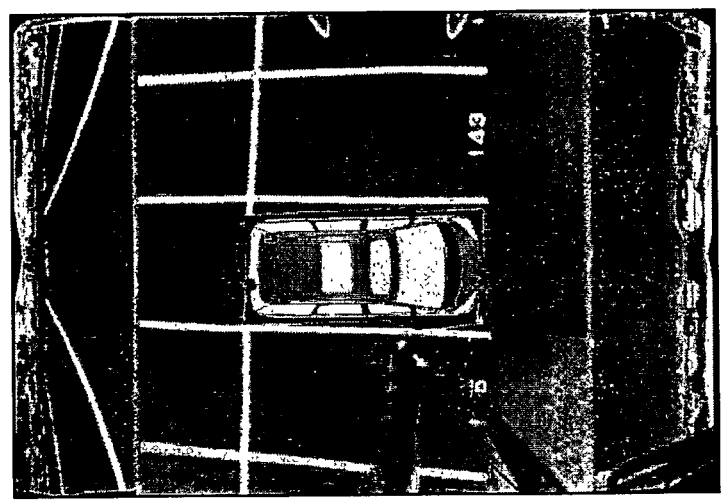
FIG. 9 is a diagram for showing examples of a display mode according to Embodiment 3 of the invention.

1. Example of display mode employed in stopping vehicle:

FIG. 9A shows an example of the display mode in which images necessary for grasping far regions in the front and the rear of the vehicle are pasted in corresponding areas of a virtual viewpoint image overlooked from above. Since not only the surrounding state of the vehicle but also the state ahead in the moving direction of the vehicle can be grasped at a glance, this is used for checking the surrounding state before and immediately after starting driving after stopping at a traffic light or the like, and is also used in parallel parking or perpendicular parking.

Figure 9B:
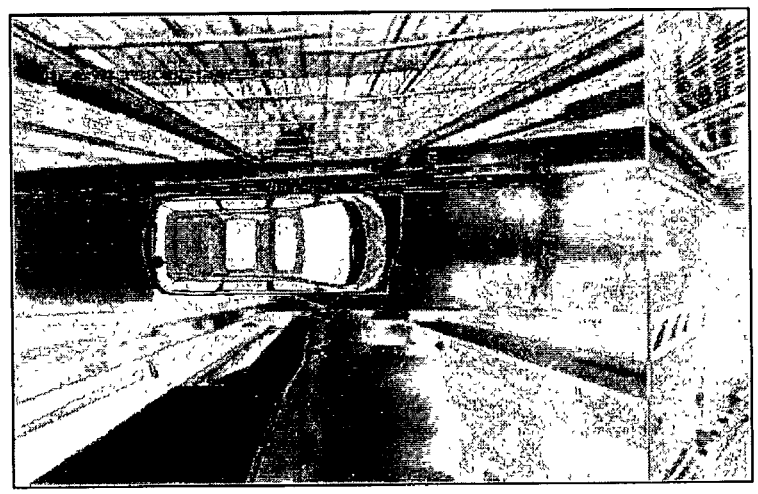
Figure 9C:
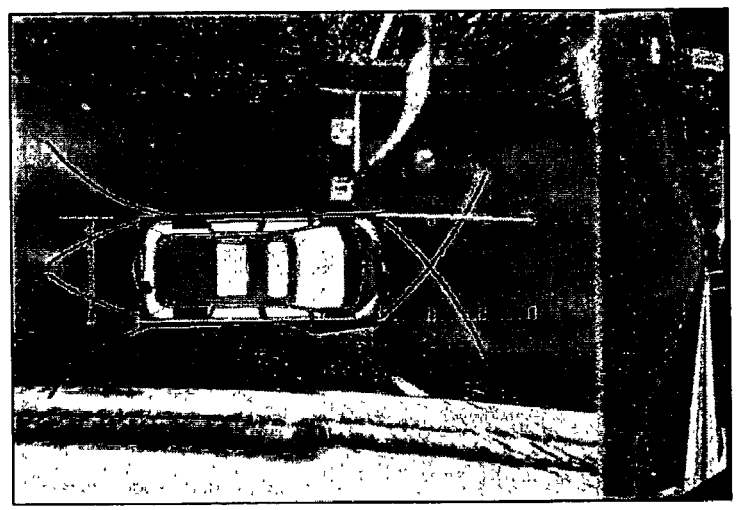

2. Examples of display mode employed in slowly driving forward:

FIGS. 9B and 9C show examples of the display mode in each of which an image necessary for grasping the state in a far front region of the vehicle is pasted in a corresponding area of a virtual viewpoint image overlooked from above. Not only the state around the vehicle but also the state ahead in the moving direction can be grasped at a glance.

The difference between the examples of FIGS. 9B and 9C is a difference in the image for grasping the state in the far front region. First, in FIG. 9B, the overlook image and the front image are linked in a road surface area on the boundary. Since the images are linked in the road surface area, the position of an obstacle in front of the vehicle can be easily grasped. This is useful in slowly driving, for example, not only immediately after starting driving but also driving in a narrow road or driving close to a tollgate. On the other hand, in FIG. 9C, the front image has a visual field of 180 degrees so as to compensate a dead angle of the overlook image. Although this is disadvantageous in lack of continuity on the boundary between the images, it has a merit that information of the front region with a wide visual field can be simultaneously viewed. In particular, this is suitably used for checking the state of the front region with a range of 180 degrees before starting driving.

The virtual viewpoint image may be continuously switched so that an area in front of the vehicle can be enlarged as the forward driving speed increases and that the vehicle can be imaged closer to the center of the screen as the forward driving speed decreases. Furthermore, a panorama image of the rear region alone may be displayed as the display mode when the vehicle speed exceeds a given speed.

Figure 10A:
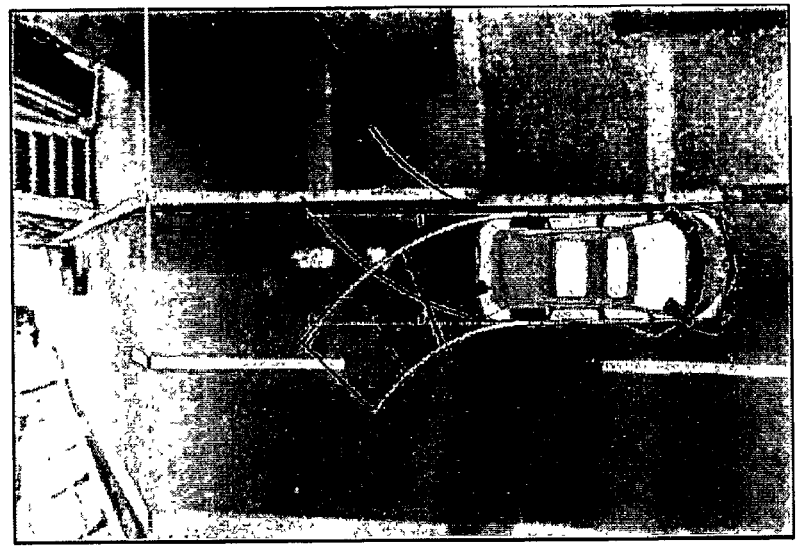
FIG. 10 is a diagram for showing other examples of the display mode according to Embodiment 3 of the invention.
Figure 10B:
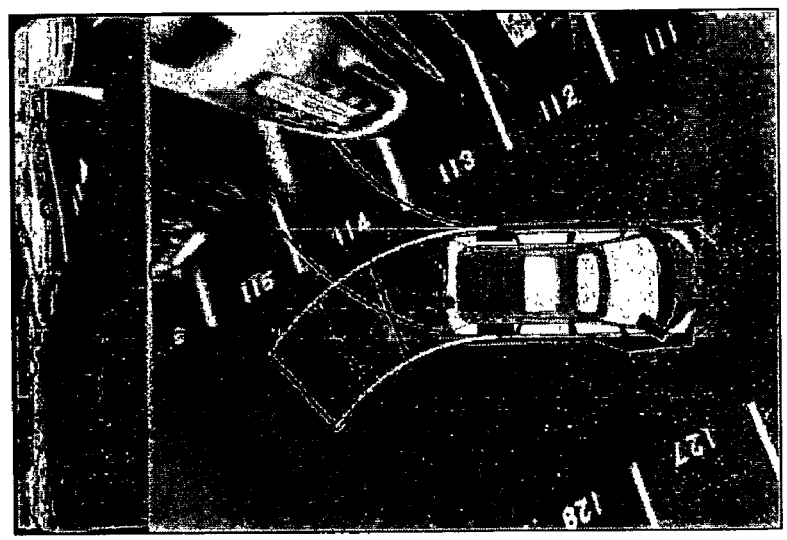

3. Examples of display mode employed in driving backward:

FIGS. 10A and 10B show examples of the display mode in each of which an image necessary for grasping the state in a far rear region is pasted in a corresponding area of a virtual viewpoint image overlooked from above. Not only the state around the vehicle but also the state ahead in the reversing direction can be grasped at a glance.

The difference between the examples of FIGS. 10A and 10B is a difference in the image for grasping the state in the far rear region. First, in FIG. 10A, the overlook image and the front image are linked in a road surface area on the boundary. Since the images are linked in the road surface area, the position of an obstacle in front of the vehicle can be easily grasped. Since the road surface is continuous on the boundary, this image is suitably used in starting perpendicular parking or parallel parking. On the other hand, in FIG. 10B, the rear image has a visual field of 180 degrees for compensating a dead angle of the overlook image. Although this is disadvantageous in lack of continuity on the boundary between the images, it has a merit that any dead angles can be eliminated from the rear region of the vehicle full of dead angles. In particular, this is suitably used in reversing for checking the state in the rear region with a range of 180 degrees.

The virtual viewpoint image may be continuously switched so that an area behind the vehicle can be enlarged as the backward driving speed increases and that the vehicle can be imaged closer to the center of the screen as the backward driving speed decreases.

Also, the display mode of FIG. 9A may be used not only when the vehicle is not moving at all but also when the forward and backward movements are frequently repeated as in the maneuvering accompanied with back-and-forth movement. If the images of FIGS. 9B and 10A are alternately switched, for example, in the maneuvering accompanied with back-and-forth movement, it may be troublesome to view such images. In such a case, the image of FIG. 9A may be always displayed while the absolute value of the vehicle speed is smaller than a given value.

Although the display mode of Embodiment 3 has been described by showing the use of the eight cameras as an example, the invention is not of course limited to this but can present a driver with an image effectively used in reversing, for example, even in the case where merely one or two cameras can be installed at the center of the rear portion of the vehicle due to restriction in cost or the like.

FIG. 20 is a diagram for showing a display mode of this embodiment obtained by using two cameras. FIG. 20A shows an example of camera images of two cameras BR and BL installed on the rear portion of the vehicle, FIG. 20B is a diagram for showing the position of a virtual viewpoint (looking vertically downward from above the center of the rear end of the vehicle) employed in generating a virtual viewpoint image, and FIG. 20C is a synthesized image generated by using the two camera images of FIG. 20A. In the synthesized image of FIG. 20C, the virtual viewpoint image overlooked from above is disposed in a lower area and an image necessary for grasping the state in a far rear region is disposed above.

In the case where merely two cameras installed on the rear portion of the vehicle are used as in this example, although an image of a side region of the vehicle cannot be obtained, an image of the rear region of the vehicle with a visual field of substantially 180 degrees can be obtained. Therefore, not only the state around the vehicle but also the state ahead in the reversing direction can be grasped at a glance of the image. Accordingly, in reversing for perpendicular parking or parallel parking, such a synthesized image generated by using two cameras is sufficiently practically used.

Figure 21A:
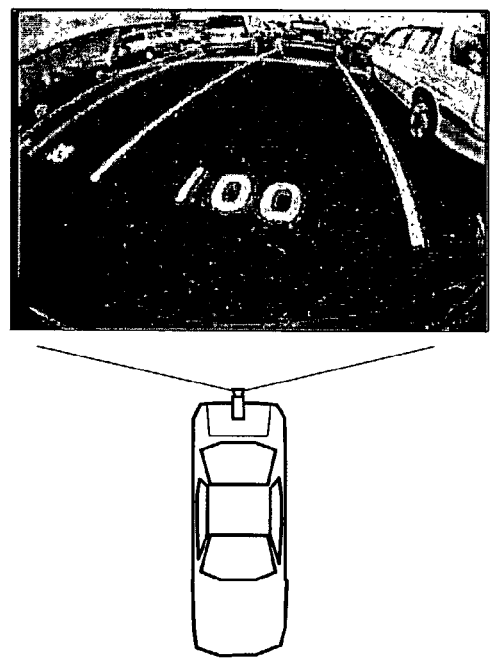
FIG. 21 is a diagram of still other examples of the display mode according to Embodiment 3 of the invention.
Figure 21B:
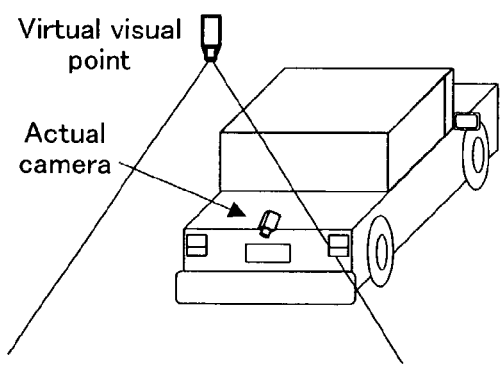
Figure 21C:
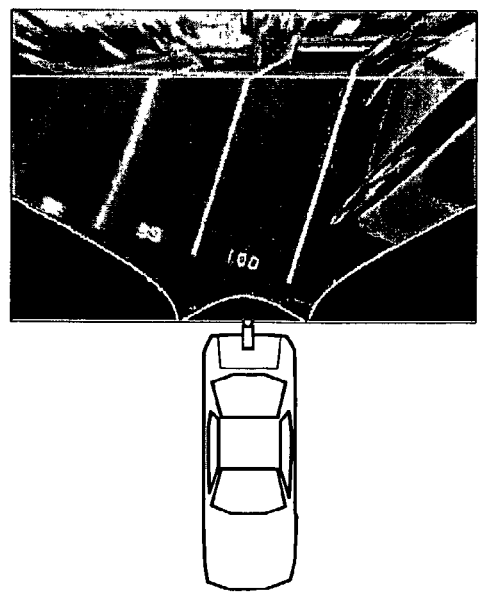

FIG. 21 is a diagram of a display mode of this embodiment obtained by using one camera. FIG. 21A shows a camera image of one camera installed on the rear portion of the vehicle, FIG. 21B is a diagram for showing the position of a virtual viewpoint (looking vertically downward from above the center of the rear end of the vehicle) employed in generating a virtual viewpoint image and FIG. 21C shows a synthesized image generated by using the camera image of FIG. 21A. In the synthesized image of FIG. 21C, the virtual viewpoint image overlooked from above is disposed in a lower area and an image necessary for grasping the state in a far rear region is disposed above.

Since merely one camera is used in this example, not only a side region of the vehicle but also a region obliquely behind the vehicle is out of the visual field. However, as is understood from FIG. 21C, if the field angle of the camera is approximately 130 degrees, a sufficient visual field for the rear check can be obtained and not only the state around the vehicle but also the state ahead in the reversing direction can be grasped at a glance. Therefore, even such a synthesized image generated by using one camera can be sufficiently practically used in reversing for perpendicular parking or parallel parking. Furthermore, when a fisheye lens is used, a sufficiently large visual field can be obtained even in using merely one camera.

Figure 20A:
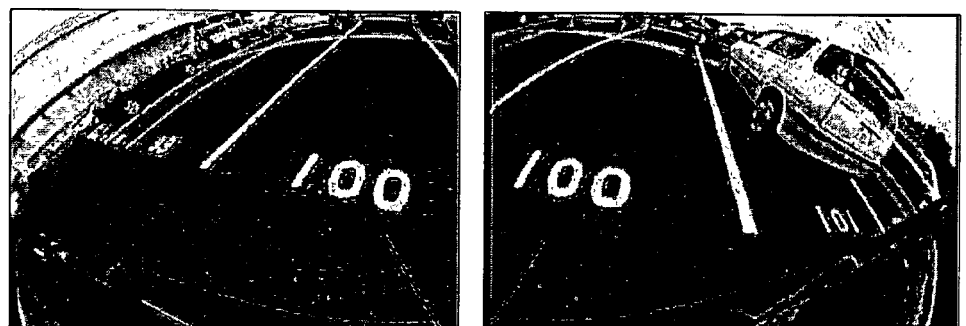
FIG. 20 is a diagram of other examples of the display mode according to Embodiment 3 of the invention.
Figure 20A:
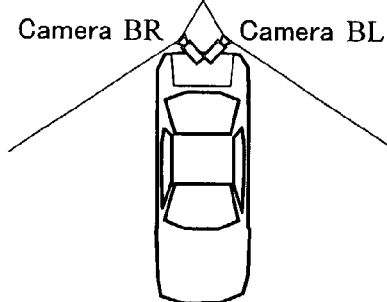
Figure 20B:
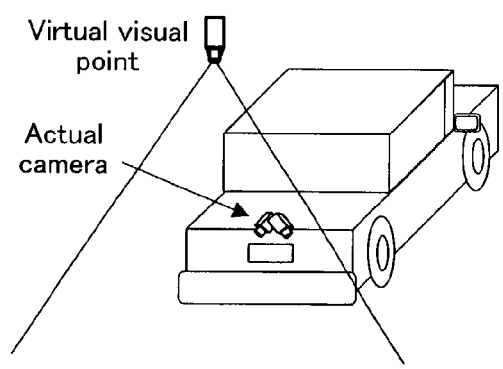
Figure 20C:
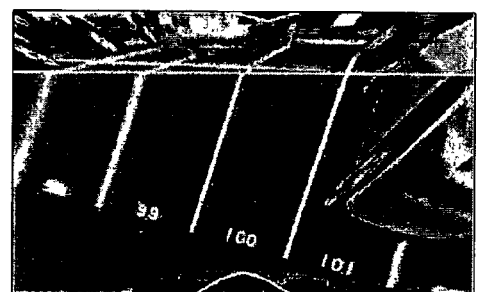
Figure 20C:
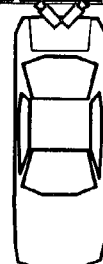

The illustrations of the vehicles of FIGS. 20C and 21C are pasted for showing the rough positions of the vehicle in the synthesized image. Needless to say, when the size of the illustration accurately accords with the size in the synthesized image, the driving can be further eased.

EMBODIMENT 4

Embodiment 4 corresponds to one aspect of the invention for overcoming the fourth problem, and a driver is presented with a synthesized image in which any object other than those present on the road surface does not vanish even in a virtual viewpoint image synthesized by deforming and cutting camera images.

Now, examples of the display mode will be specifically described with reference to the drawings.

Figure 11A:
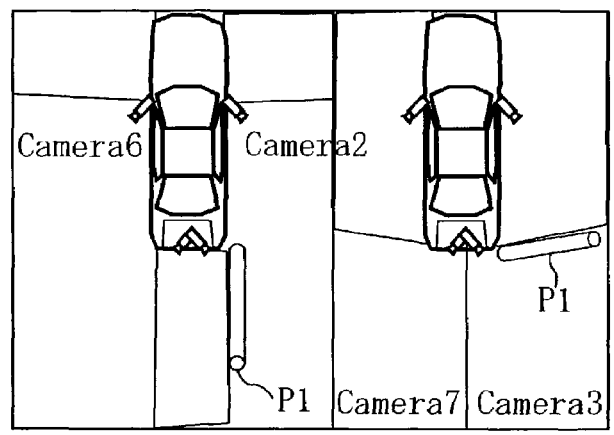
FIG. 11 is a diagram for showing examples of an image according to Embodiment 4 of the invention.
Figure 17A:
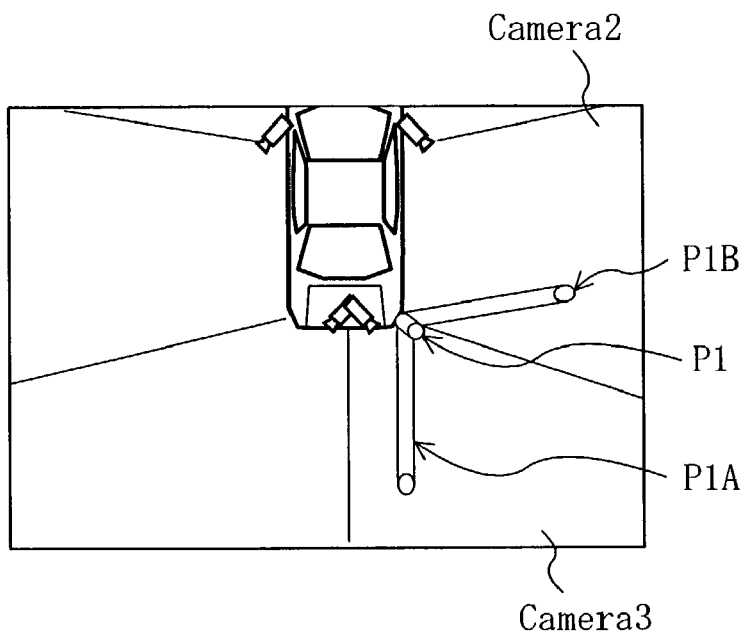
FIG. 17 is a diagram for explaining a fourth problem to be solved by the invention.
Figure 17B:
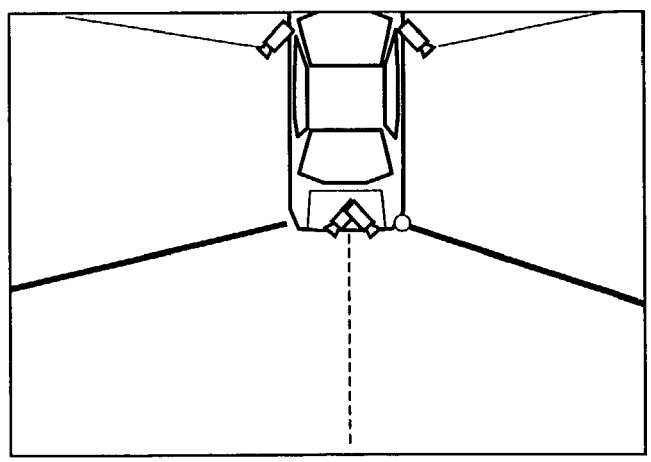
Figure 18:
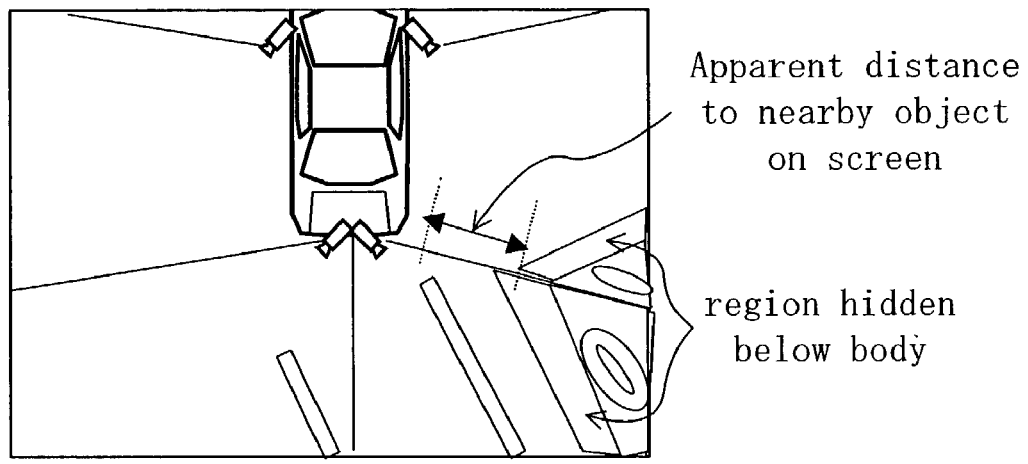
FIG. 18 is a diagram for explaining a fifth problem to be solved by the invention.

FIG. 11A shows an example of an image of this embodiment in which a first virtual viewpoint image obtained by using merely two backward cameras (cameras 2 and 6) installed on the side portions of the vehicle and a second virtual viewpoint image obtained by using merely pair cameras (cameras 3 and 7) installed on the rear portion are displayed on the screen in parallel. Each of these virtual viewpoint images is a virtual viewpoint image generated by using one camera alone without using the other camera out of the cameras having overlapping camera regions (namely, the cameras 2 and 3 or the cameras 6 and 7). In each virtual viewpoint image, an area corresponding to the camera range of one camera used for the generation includes both a portion overlapping the camera range of the other camera and a portion not overlapping. Accordingly, the pole P1 standing in the right rear corner of the vehicle, which vanishes in the virtual viewpoint image of FIG. 17B, is imaged on the screen without vanishing in both the two virtual viewpoint images. Needless to say, instead of displaying the two images in parallel on the screen, a plurality of virtual viewpoint images may be displayed in different screens so as to be switched.

In general, such a phenomenon of vanishment of an object other than those present on the road surface occurs when the following two conditions are both met:

Condition 1: The object is captured in different directions by cameras respectively used for obtaining two partial images having the boundary therebetween.

This means that if the direction for viewing the object is different between the two cameras, the distorting direction of the object is different in virtual viewpoint images respectively obtained by transforming the camera images. This is obvious also from the deformation of the pole P1 in FIG. 17A.

Condition 2: The object is in the vicinity of the boundary between the partial images.

This means that if the object distorted by the transformation is in the vicinity of the boundary, a distortedly elongated portion is almost erased through the cutting processing for generating a partial image. This is also obvious from the deformation of the pole P1 in FIG. 17A.

Figure 12A:
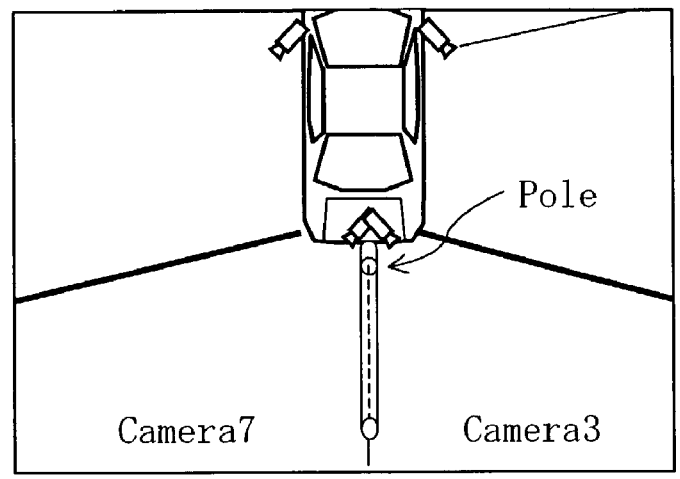
FIG. 12 is a diagram for explaining a situation in which an object in the vicinity of a boundary vanishes in a virtual viewpoint image.

Accordingly, if Condition 1 is not met, the object never vanishes. FIG. 12A is a conceptual diagram for showing an example in which the object does not vanish even though Condition 2 is met. In FIG. 12A, although a pole stands just behind the pair cameras installed on the rear portion of the vehicle, since Condition 1 is not met, namely, both the cameras 3 and 7 face in substantially the same direction against the pole, the pole is distorted to elongate downward on the screen in the same manner in deforming the both camera images. Therefore, the pole can be prevented from vanishing by performing processing for mixing the partial image of the camera 3 and the partial image of the camera 7 on the boundary.

Figure 12B:
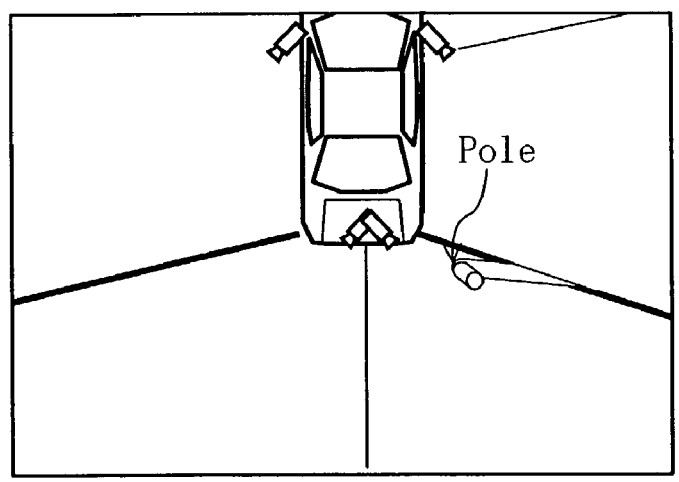

Similarly, if Condition 2 is not met, the object minimally vanishes. FIG. 12B is a conceptual diagram for showing an example in which the object does not vanish even though Condition 1 is met. In FIG. 12B, the pole stands in a right rear position of the vehicle at a distance and is included in the visual ranges of the cameras 2 and 3 installed on the different portions, and hence, Condition 1 is met. However, since Condition 2 is not met, namely, the pole is away from the boundary between the partial image of the camera 2 and the partial image of the camera 3, the pole distorted to elongate rightward of the screen from the bottom in the partial image of the camera 3 does not vanish at least up to the boundary.

Accordingly, as one index in designing a structural plan of the screen, a boundary between partial images generated from different two camera images is not formed on one screen in order to avoid Condition 1. The aforementioned diagram shows an example of this index, and in order not to form the boundaries between the camera images of the cameras 2 and 3 and between the camera images of the cameras 6 and 7 on the same screen, the images are dividedly displayed on the two screens.

Figure 11B:
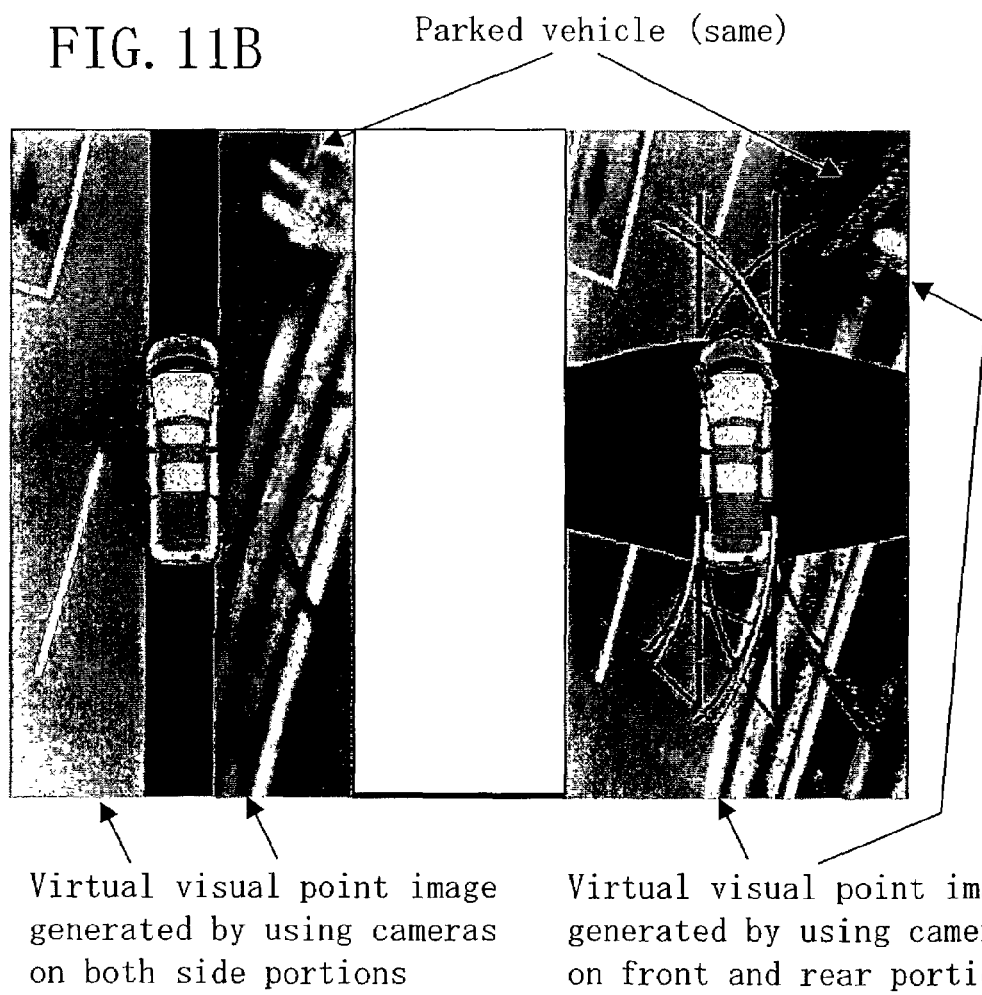

Alternatively, when the eight camera images as shown in FIG. 2 are used, the two screens as shown in FIG. 11B can be used as a displayed image (although camera images used for the synthesis are not shown). In FIG. 11B, a synthesized image obtained by using merely the cameras installed on the side portions and a synthesized image obtained by using merely the cameras installed on the front and rear portions are displayed as the virtual viewpoint images on the screen in parallel. After all, any screen structure other than those described in this embodiment may be employed as far as it is generated on the basis of the aforementioned index.

EMBODIMENT 5

Embodiment 5 corresponds to one aspect of the invention for overcoming the fifth problem, and in order not to hinder driving by a discontinued and unclear area on the boundary between adjacent partial images in a virtual viewpoint image, another image of the discontinued area fit in the virtual viewpoint image is presented to a driver.

Now, examples of the display mode will be specifically described with reference to the drawings.

Figure 13A:
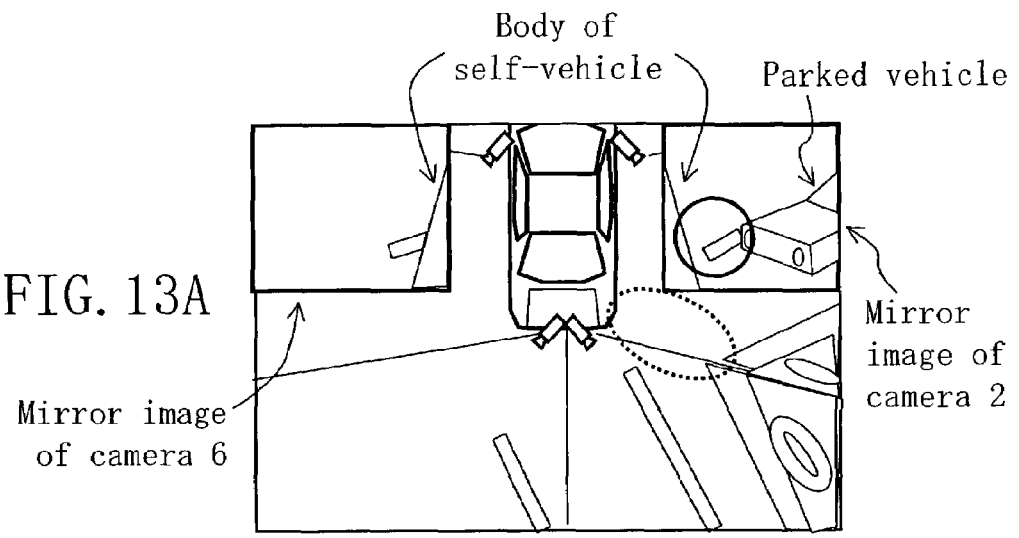
FIG. 13 is a diagram for showing examples of a display mode according to Embodiment 5 of the invention.

FIG. 13A is a diagram of the display mode generated by using the four cameras 2, 3, 6 and 7 of FIG. 2. A virtual viewpoint image overlooked from above that is generated by using the four camera images is used in the whole screen with one sub-window for a mirror image of a rear right region of the vehicle captured by the camera 2 displayed in an upper right area of the screen and another sub-window for a mirror image of a rear left region of the vehicle captured by the camera 6 displayed in an upper left area of the screen. In an elliptical area surrounded with a broken line in the virtual viewpoint image, the closeness to a parked vehicle can be merely roughly grasped. However, in the mirror image captured by the camera 2 and displayed in the sub-window, the closeness to the parked vehicle can be grasped at a glance of a circular area surrounded with a solid line.

Figure 13B:
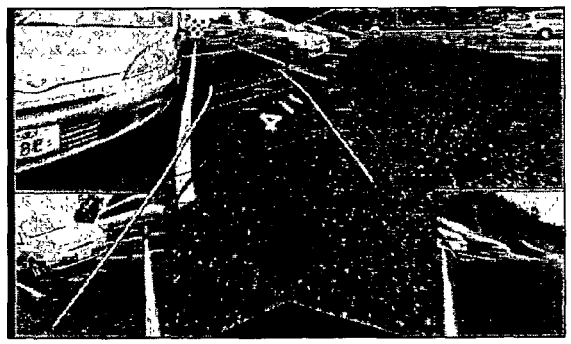

Also, FIG. 13B is a diagram of another example of the display mode generated by using the four cameras 2, 3, 6 and 7 of FIG. 2 (although camera images used for the synthesis are not shown). A mirror virtual viewpoint image overlooked obliquely downward from above synthesized by using the camera images of the cameras 3 and 7 is used in the whole screen with a sub-window for a mirror image of the camera image of the camera 2 displayed in a lower right area and another sub-window for a mirror image of the camera image of the camera 6 displayed in a lower left area. In the example of FIG. 13B, since a gazing point is assumed to be collected in the virtual viewpoint image in an upper half area of the whole screen, the sub-windows are respectively disposed in the lower right and left areas. The effect is the same as that attained in the example of FIG. 13A.

In either example, the sub-windows may be fixedly disposed in such areas corresponding to the background of the virtual viewpoint image that the driving is not hindered even when covered, or the positions of the sub-windows may be appropriately moved in accordance with the surrounding state and the like.

When such a screen structure is employed, the positional relationship between the vehicle and a nearby object can be grasped by using the virtual viewpoint image, and with respect to a discontinued area on the boundary, the detailed closeness to the object near the vehicle can be grasped without moving the line of sight by viewing the mirror image displayed in the sub-window.

EMBODIMENT 6

Embodiment 6 corresponds to one aspect of the invention for overcoming the sixth problem, and an image of a side region of the vehicle, that is, a region whose detailed state a driver desires to grasp in a complicated driving operation, is presented to the driver preferentially to images of other regions.

Figure 14A:
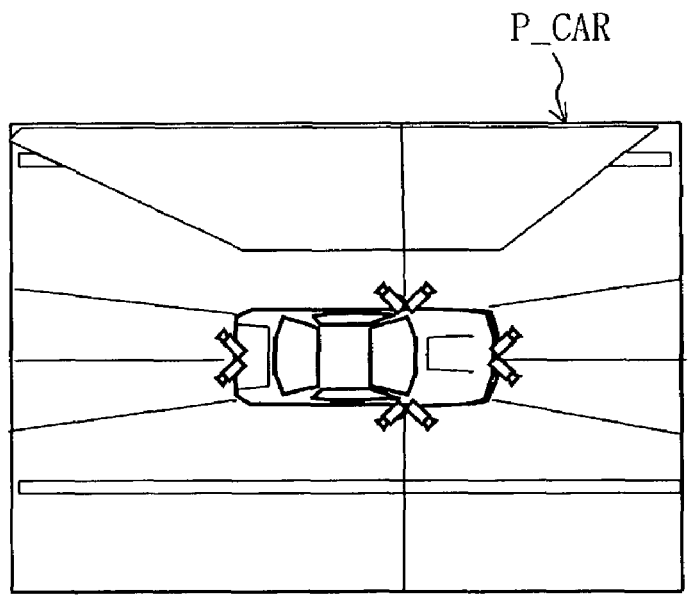
FIG. 14 is a diagram for showing examples of a display mode according to Embodiment 6 of the invention.
Figure 14B:
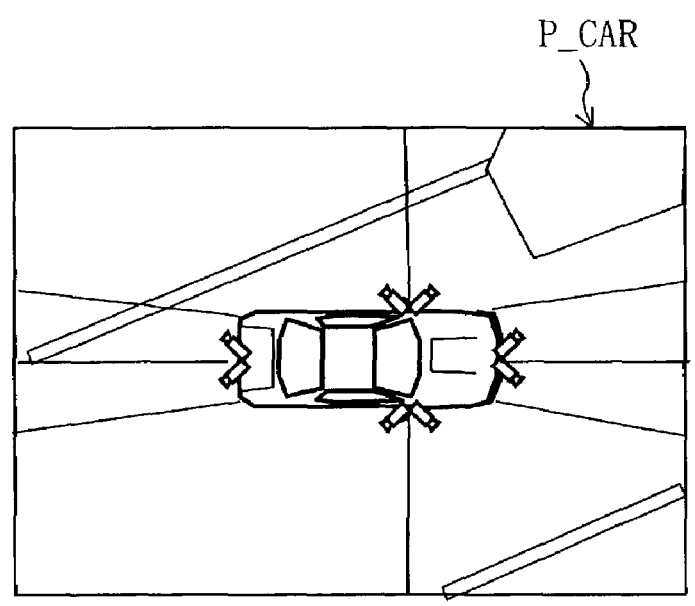

FIGS. 14A and 14B are diagrams of synthesized images presented, in parallel parking, that is, one of the complicated driving operations, at the start of the parking operation and in the middle of the parking operation, respectively. In either virtual viewpoint image, since cameras installed on the side portion of the vehicle are preferentially used, a parked vehicle P_CAR is reproduced in the image by using the cameras 4 and 5 alone, and hence, the problem of a discontinued area is overcome.

Needless to say, when the partial images are thus laid out, discontinued areas are collected in the front and rear of the vehicle, which may give an odd feeling to a user. However, with respect to this, the odd feeling derived from the discontinued areas can be released by, for example, displaying an image necessary for grasping the state ahead in the moving direction of the vehicle together with the virtual viewpoint image as described in Embodiment 3.

In the aforementioned example, the cameras installed on the side portion of the vehicle are preferentially used for forming a boundary in the virtual viewpoint image so that a region desired to closely observe in the perpendicular parking can be easily viewed. The boundary between the partial images may be appropriately switched in accordance with the purpose and the driving situation. As a result, an image more easily grasped by the driver can be presented.

Figure 15A:
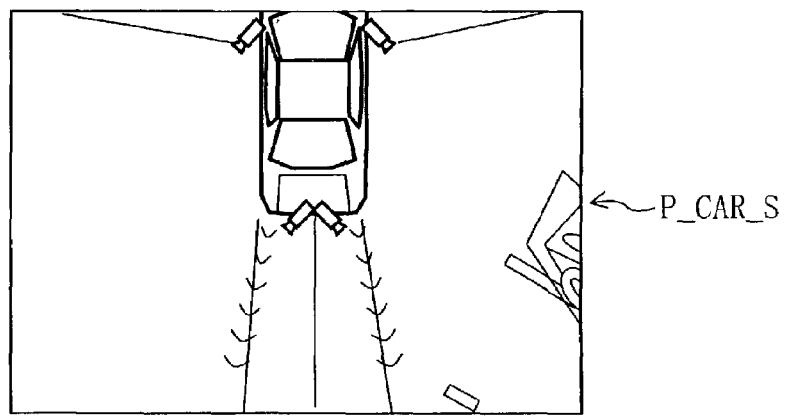
FIG. 15 is a diagram for showing an example of display mode switching according to Embodiment 6 of the invention.
Figure 15B:
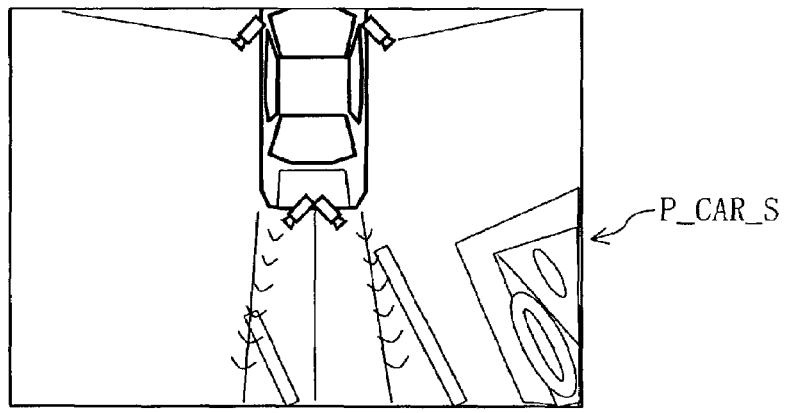
Figure 15C:
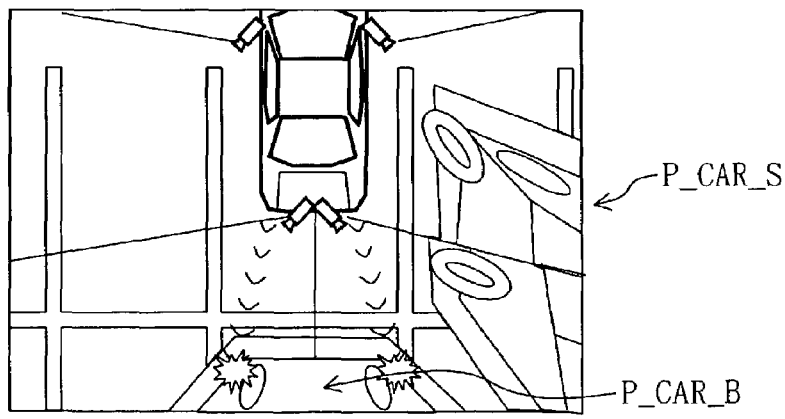

FIG. 15 is a diagram for showing an example of switching of the boundary between the partial images employed in perpendicular parking. In perpendicular parking, from the start of the operation (shown in FIG. 15A) to the middle thereof (shown in FIG. 15B), it is necessary to mainly check whether or not the vehicle would scrape an object present on the side of the vehicle (such as a parked vehicle P_CAR_S). Therefore, the cameras installed on the side portion of the vehicle are preferentially used so as to present a virtual viewpoint image obtained by using the camera images of the cameras on the side portion as wide as possible. On the other hand, at the ultimate stage in which approximately a half of the vehicle has entered the parking space, it is necessary to mainly check whether or not the vehicle would hit an object present behind the vehicle (such as a parked vehicle P_CAR_B). Therefore, the cameras installed on the rear portion of the vehicle are preferentially used so as to present a virtual viewpoint image obtained by using the camera images of the cameras on the rear portion as wide as possible.

At this point, for switching the mode for preferentially using the cameras on the side portion to the mode for preferentially using the cameras on the rear portion, for example, a detection signal of a sensor installed on the vehicle for detecting an object behind may be used as a trigger. If the sensor detects any object present behind the vehicle, this detection is used as a trigger for switching to the display mode for preferentially using the cameras on the rear portion.

As the trigger for the switching, anything such as manipulation of the steering wheel or the gearshift lever may be used instead of the object detect sensor. Alternatively, it goes without saying that the driver may manually switch the display mode.

Figure 16:
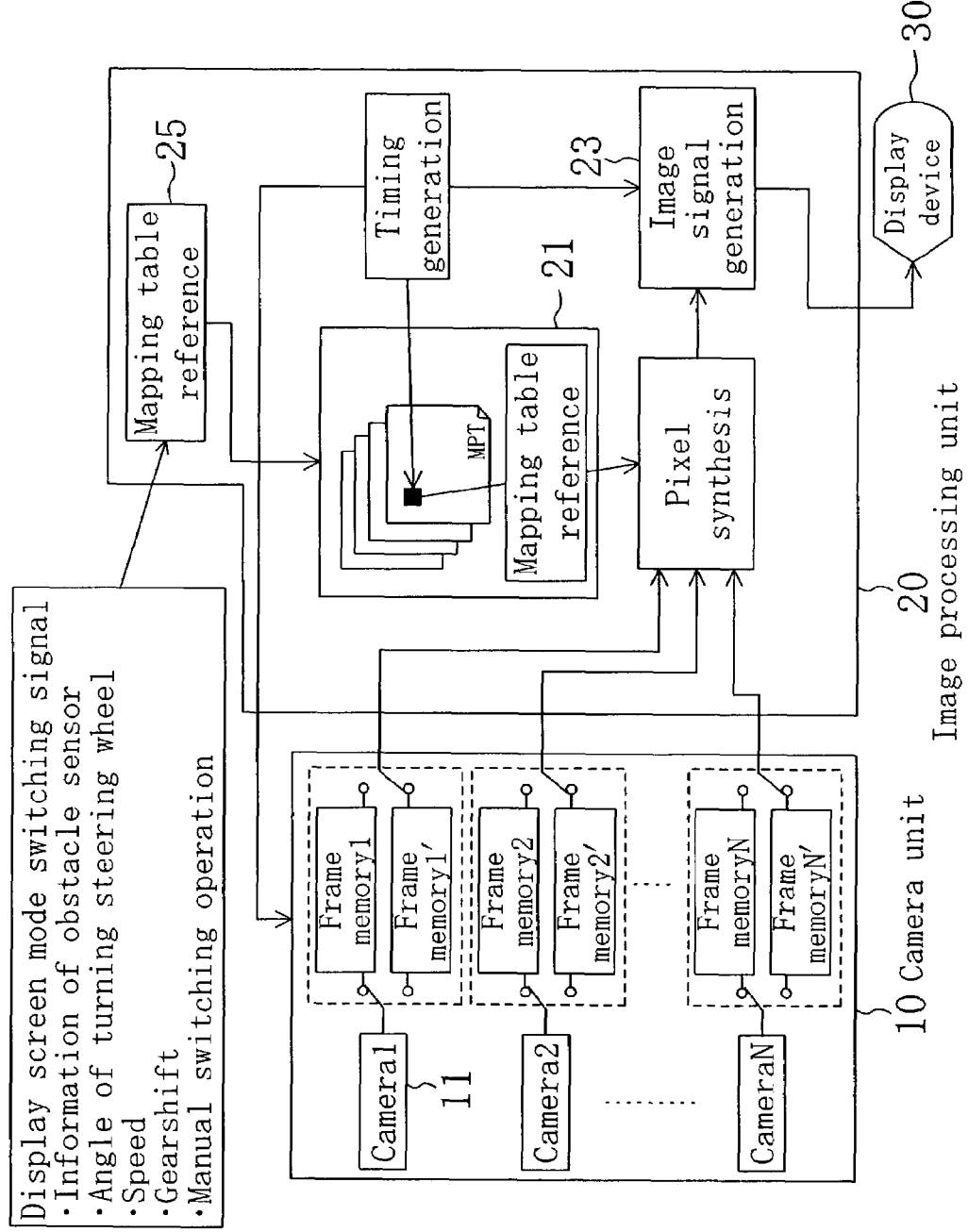
FIG. 16 is a block diagram for showing a system structure for realizing the display mode switching of FIG. 15.

FIG. 16 is a block diagram for showing a system structure for realizing the aforementioned switching of the display mode. In the structure of FIG. 16, a mapping table selecting unit 25 receives a display mode switching signal (such as a signal of the object detect sensor) so as to exchange a mapping table MPT in accordance with the content of the signal. For example, in order to realize the aforementioned automatic switching, a mapping table for the display mode for preferentially using the cameras on the side portion and a mapping table for the display mode for preferentially using the cameras on the rear portion are previously prepared.

So far, various display modes of the synthesized image for achieving the objects of the invention have been described. As an apparatus for realizing the synthesized image, mapping tables respectively corresponding to images to be displayed may be prepared, or a mapping table may be automatically generated in accordance with the situation.

A vehicle of this invention includes an ordinary car, a light car, a truck, a bus and the like. Also, a special vehicle such as a crane truck and an excavator may be a vehicle of this invention as far as the technical idea of the invention is applicable.

In the above description, the monitoring system of this invention is applied to a vehicle, but it is similarly applicable to any moving body other than the vehicle such as an airplane and a ship. Alternatively, cameras may be installed on a monitoring target other than the vehicle such as a shop, a house and a showroom.

Furthermore, the positions and the number of the plural cameras are not limited to those described herein. For example, each pair cameras may be installed in each of the four corners of the vehicle.

The function of the image processing unit of this invention may be wholly or partially realized by dedicated hardware or software. Also, a recording medium or a transfer medium storing a program for making a computer execute the whole or part of the function of the image processing unit of this invention may be used. For example, in a structure using a computer, each processing means such as the image synthesizing unit is realized by software executed by a CPU so as to be stored in a ROM or a RAM.

In this manner, according to the invention, since a mirror image with an extensive view having a lateral visual field of 180 degrees in the rear of a vehicle is displayed, a user can definitely recognize an object present in this visual range by using the displayed image. Accordingly, in the case where the vehicle is to be maneuvered to a road by reversing while turning at a right angle as shown in FIG. 4, the driving operation can be performed with merely the image viewed without the assistance of another person.

Furthermore, according to the invention, an image in which a grounding portion of at least one tire of the vehicle is relatively enlarged and other areas farther from the vehicle are more reduced is displayed. Therefore, a user can simultaneously check the detailed state close to and below the vehicle and the state ahead in the moving direction based on the same image. Accordingly, in the case of driving close to a road edge or the like, not only the closeness of the vehicle to the road edge but also the state ahead in the forward or backward moving direction can be grasped. Therefore, even an inexperienced driver can pass by another vehicle running in the opposite direction in a narrow road or can drive close to the road edge very easily with merely the image viewed.

Moreover, according to this invention, an image of a region ahead in a moving direction or a direction to which the vehicle can move is displayed together with a virtual viewpoint image with their positional relationship kept. Therefore, a user can simultaneously check not only the state around the vehicle but also the state ahead in the forward or backward moving direction based on the same image. Accordingly, in the case of repeatedly driving forward and backward as in maneuvering for parking accompanied with back-and-forth movement, there is no need to frequently check the state ahead in the moving direction through visual observation or with a mirror, and hence, the user can concentrate upon the driving.

Also, according to the invention, in an overlapping camera ranges in each virtual viewpoint image, one of camera images is used without being erased, and hence, an object present in the overlapping camera range never vanishes in the virtual viewpoint image. Therefore, an image always including information necessary for safety driving can be presented to a driver, and the driver can check the surrounding state with a sense of security based on the image alone.

Furthermore, according to the invention, camera images as if they were seen on the right and left door mirrors are displayed together with a virtual viewpoint image. Therefore, a user can check, in one screen, the rough relationship between the vehicle and a nearby object by using the virtual viewpoint image as well as a distance from the vehicle to an object present on the side of the vehicle behind the driver's seat by using the door mirror image. Accordingly, the driver can grasp the surrounding state by merely viewing the screen without checking the door mirror or directly visually observing, and hence, the driver can concentrate upon the driving with a sense of security based on the screen alone.

Moreover, according to the invention, an image captured by a camera installed on the side portion of the vehicle is preferentially used for generating a virtual viewpoint image in one mode. Therefore, with respect to a side region of the vehicle, that is, a region whose detailed state a driver desires to grasp in a driving situation requiring a complicated driving operation, an image including no discontinued area and minimally giving an odd feeling can be presented to the driver.

The invention claimed is:

1. A monitoring system comprising:
one or more cameras for capturing surrounding state of a vehicle; and
an image processing unit for receiving a camera image of said one or more cameras and generating a synthesized image viewed from a virtual viewpoint to be displayed on a display device using said camera image and a perspective projection conversion method, the synthesized image viewed from a virtual viewpoint set above the one or more cameras in a downward direction,
wherein said synthesized image includes an enlargement ratio of a nearby area of the vehicle including grounding portion of the tire being relatively higher than an enlargement ratio of a peripheral area around the vehicle.

2. The monitoring system of claim 1,
wherein the enlargement ratio becomes lower in a direction from said nearby area of the vehicle to said peripheral area of the vehicle in said synthesized image.

3. The monitoring system of claim 1,
wherein said image processing unit generates said synthesized image in such a manner that an area along a side surface of the vehicle has linearity.

4. The monitoring system of claim 1,
wherein at least one camera out of said one or more cameras is installed to have a camera range at least including part of a body side surface and part of a front tire, and
said image processing unit generates, from a camera image of said at least one camera, said synthesized image in such a manner that said body side surface and said front tire are imaged therein.

5. A monitoring system comprising:
one or more cameras for capturing surrounding state of a vehicle; and
an image processing unit for receiving a camera image of said one or more cameras and generating a synthesized image to be displayed on a display device based on said camera image,
wherein said image processing unit is operable to project said camera image onto a bowl model and operable to generate said synthesized image viewed from a virtual viewpoint, and said synthesized image includes an enlargement ratio of a nearby area of the vehicle including grounding portion of the tire being relatively higher than an enlargement ratio of a peripheral area around the vehicle.

6. A monitoring system comprising:
one or more cameras for capturing surrounding state of a vehicle; and an image processing unit for receiving a camera image of said one or more cameras and generating a synthesized image to be displayed on a display device based on said camera image, wherein said synthesized image includes an enlargement ratio of a nearby area of the vehicle including grounding portion of the tire being relatively higher than an enlargement ratio of a peripheral area around the vehicle, and said synthesized image includes a vehicle image having a linearity of the side surface of the vehicle, the linearity of the side surface being parallel to and ahead in the moving direction of the vehicle.

* * * * *